United States Patent
Ohkawa et al.

(10) Patent No.: US 12,537,922 B2
(45) Date of Patent: Jan. 27, 2026

(54) LIGHTING DEVICE AND PROJECTOR DEVICE

(71) Applicant: SONY GROUP CORPORATION, Tokyo (JP)

(72) Inventors: Shingo Ohkawa, Kanagawa (JP); Hiroyuki Yanagisawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 336 days.

(21) Appl. No.: 18/043,673

(22) PCT Filed: Jul. 19, 2021

(86) PCT No.: PCT/JP2021/027015
§ 371 (c)(1),
(2) Date: Mar. 1, 2023

(87) PCT Pub. No.: WO2022/059329
PCT Pub. Date: Mar. 24, 2022

(65) Prior Publication Data
US 2023/0300301 A1   Sep. 21, 2023

(30) Foreign Application Priority Data
Sep. 16, 2020 (JP) .............................. 2020-155533

(51) Int. Cl.
*H04N 9/31* (2006.01)
(52) U.S. Cl.
CPC ........... *H04N 9/312* (2013.01); *H04N 9/3194* (2013.01)

(58) Field of Classification Search
CPC .............. G03B 21/00–64; H04N 9/31–3197
See application file for complete search history.

(56) References Cited

U.S. PATENT DOCUMENTS

| | | | |
|---|---|---|---|
| 3,641,264 A | 2/1972 | Macovski | |
| 2006/0250581 A1 | 11/2006 | Silverstein | |
| 2007/0146640 A1* | 6/2007 | Silverstein | ............. H04N 9/315 353/31 |
| 2011/0228231 A1 | 9/2011 | Schreiber et al. | |
| 2015/0316758 A1 | 11/2015 | Takiguchi | |
| 2017/0339378 A1 | 11/2017 | Okumura | |
| 2021/0136335 A1 | 5/2021 | Tanaka et al. | |

FOREIGN PATENT DOCUMENTS

| | | |
|---|---|---|
| JP | 2000259068 A | 9/2000 |
| JP | 2008015064 A | 1/2008 |
| JP | 2012-530263 | 11/2012 |

(Continued)

OTHER PUBLICATIONS

International Search Report and Written Opinion prepared by the Japan Patent Office on Sep. 30, 2021, for International Application No. PCT/JP2021/027015, 2 pgs.

*Primary Examiner* — Christopher A Lamb, II
(74) *Attorney, Agent, or Firm* — Sheridan Ross PC

(57) ABSTRACT

A lighting device according to the present technology includes: a light source unit that has a light emitting element; a spatial light phase modulator that generates a plurality of reproduced images at intervals on an image surface by performing spatial light phase modulation on incident light from the light source unit; and a projection unit that superimposes and projects the plurality of reproduced images on a projection surface via different projection lenses.

18 Claims, 16 Drawing Sheets

(56) References Cited

FOREIGN PATENT DOCUMENTS

| | | |
|---|---|---|
| JP | 2019-021471 | 2/2019 |
| TW | 201932883 A | 8/2019 |
| WO | WO-2008047800 A1 | 4/2008 |
| WO | WO-2008108218 A1 | 9/2008 |
| WO | WO 2019/031187 | 2/2019 |
| WO | WO 2020/144950 | 7/2020 |
| WO | WO-2020144983 A1 | 7/2020 |
| WO | WO-2020153026 A1 | 7/2020 |

* cited by examiner

FIG. 4A
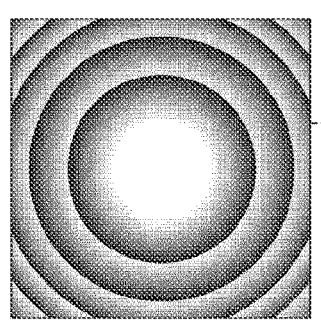
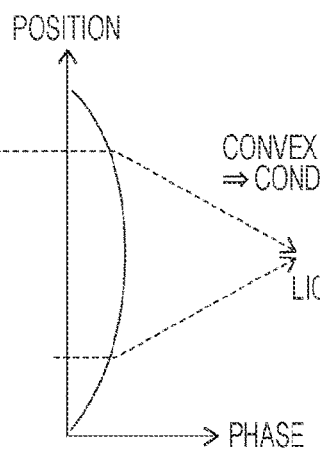
FIG. 4B
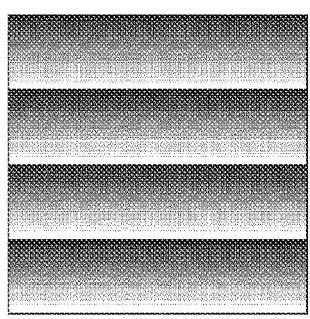
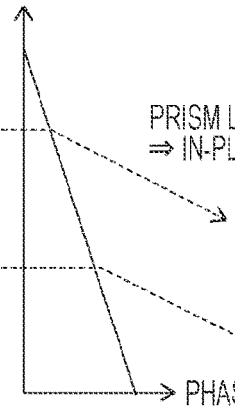

FIG. 5
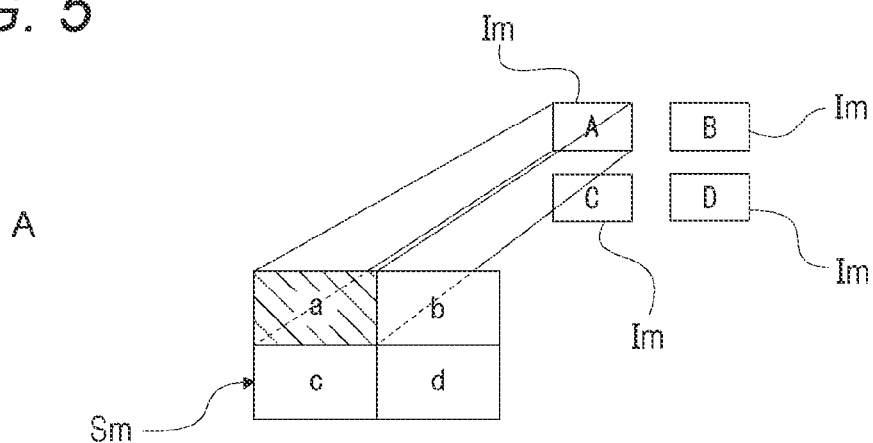
A
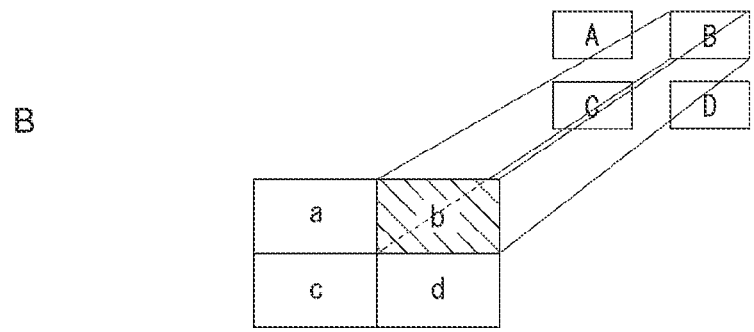
B
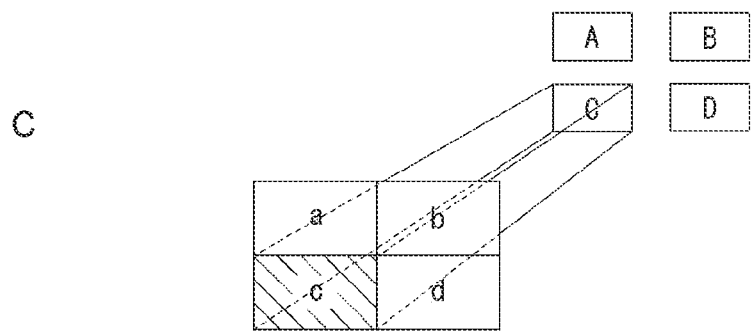
C
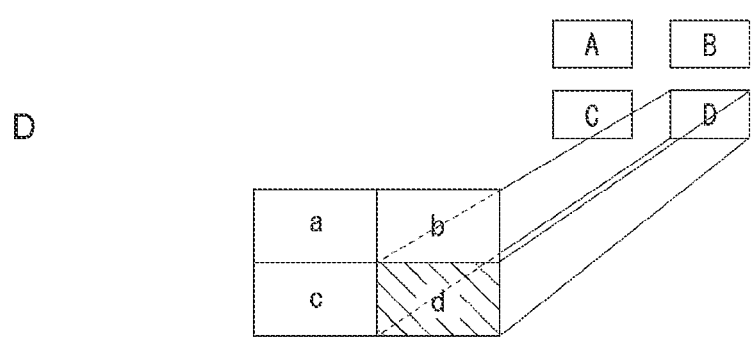
D

<CASE WHERE DIVISION IS PERFORMED FOR EACH REPRODUCED IMAGE>

⟨CASE WHERE DIVISION IS NOT PERFORMED FOR EACH REPRODUCED IMAGE⟩

FIG. 12A  CASE OF 200mm PROJECTION DISTANCE
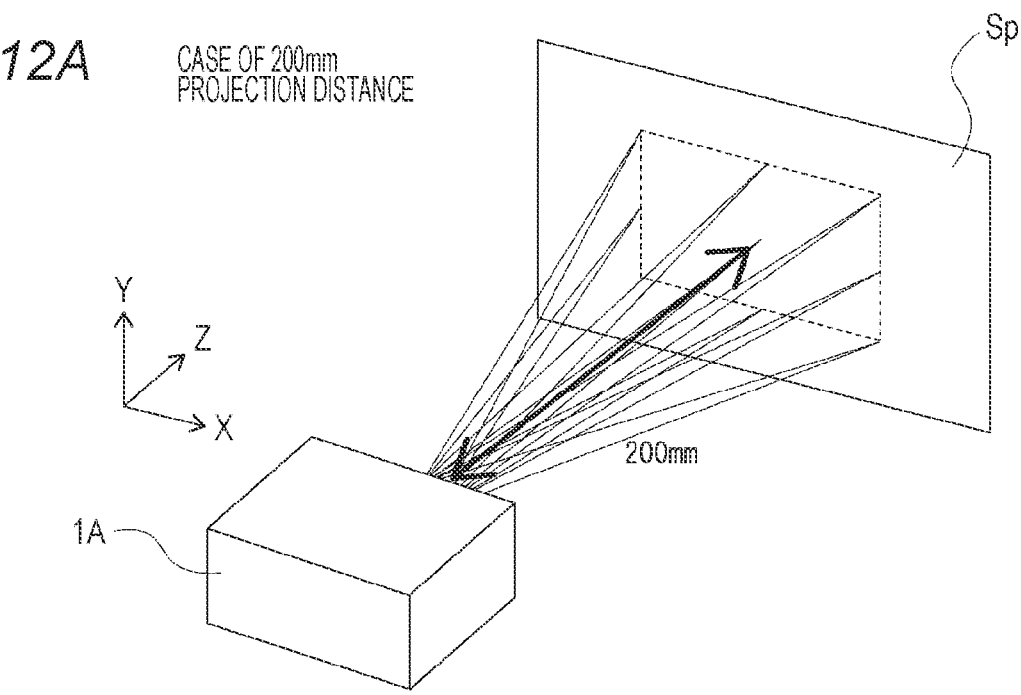
FIG. 12B
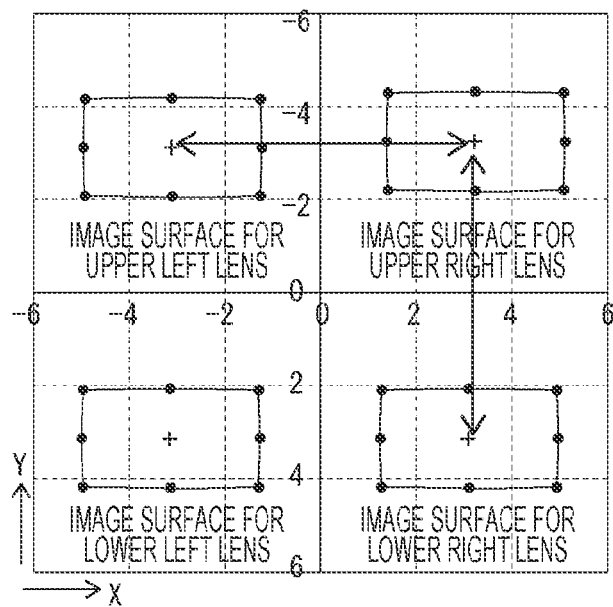

FIG. 13A  CASE OF 2000mm PROJECTION DISTANCE
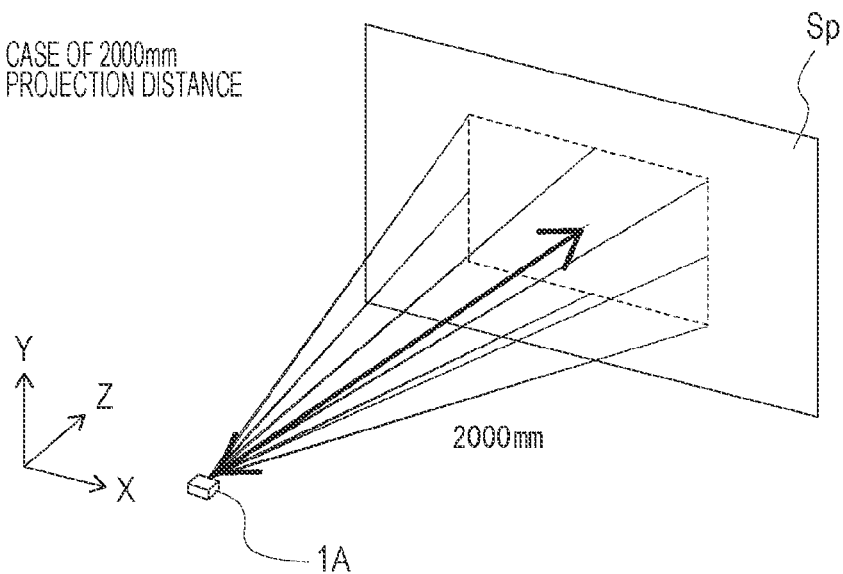
FIG. 13B
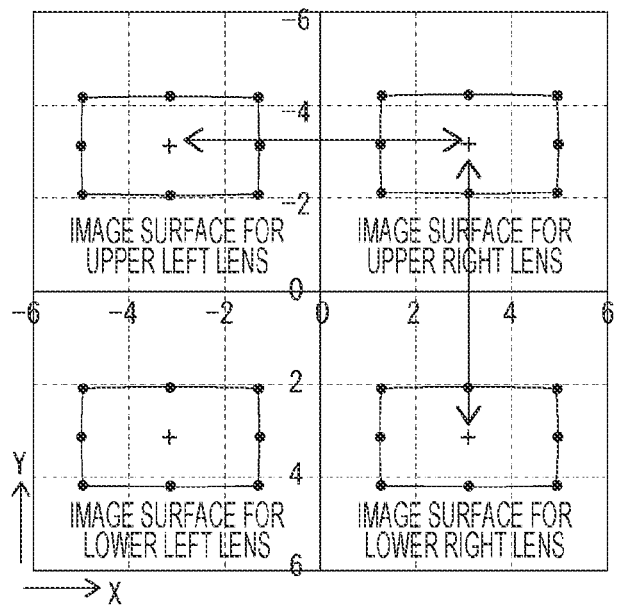

LIGHTING DEVICE AND PROJECTOR DEVICE

CROSS REFERENCE TO RELATED APPLICATIONS

This application is a national stage application under 35 U.S.C. 371 and claims the benefit of PCT Application No. PCT/JP2021/027015, having an international filing date of 19 Jul. 2021, which designated the United States, which PCT application claimed the benefit of Japanese Patent Application No. 2020-155533, filed 16 Sep. 2020, the entire disclosures of each of which are incorporated herein by reference.

TECHNICAL FIELD

The present technology relates to a lighting device and a projector device, and particularly relates to a technology for enhancing safety by reducing optical energy density.

BACKGROUND ART

Lighting devices that irradiate non-illumination objects with light have been widely used. Examples of the lighting device include a vehicle lamp such as a head lamp that emits light in a predetermined light distribution pattern (light intensity distribution pattern), a projector device that projects an image generated by applying a light intensity distribution to incident light from a light source by a spatial light modulator such as a liquid crystal panel, for example, onto a predetermined projection surface, and the like.

Note that Patent Document 1 below can be cited as a related conventional technology. FIG. 14 of Patent Document 1 discloses that in a configuration in which laser light emitted from a light source is collimated and emitted to an illumination area via a diffractive optical element and a projection lens, a diffractive optical element in which a plurality of element diffraction parts is two-dimensionally arranged is used as the diffractive optical element, a projection lens in which a plurality of unit lenses is two-dimensionally arranged is used as the projection lens, and non-adjacent element diffraction parts in the diffractive optical element illuminate the same illumination range, so that an incident direction of coherent light incident on each point of the illumination area is widened to improve safety of the coherent light.

CITATION LIST

Patent Document

Patent Document 1: Japanese Patent Application Laid-Open No. 2019-21471

SUMMARY OF THE INVENTION

Problems to be Solved by the Invention

Here, a reproduced image to be projected can be generated by performing spatial light intensity modulation on the light from the light source. Alternatively, a reproduced image can be generated by performing spatial light phase modulation on the light from the light source. In a case where a reproduced image is generated by intensity modulation, a light intensity distribution is achieved by shielding or dimming a part of the light from the light source. Meanwhile, in a case where a reproduced image is generated by phase modulation, such shielding or dimming is not performed, and therefore light utilization efficiency can be enhanced.

On the other hand, for example, in a case where a reproduced image generated on an image surface is projected on a projection surface via a projection lens as in a projector device, optical energy density increases at a pupil position (focal plane) of the projection lens. In order to enhance safety, it is desirable to reduce such optical energy density at a pupil position. In particular, in the case where a reproduced image is generated by the above-described phase modulation, the optical energy density tends to be increased even more, and thus it is effective to take measures.

The present technology has been made in view of the above circumstances, and an object thereof is to reduce optical energy density at a pupil position and improve safety in a case where a reproduced image is generated using a spatial light phase modulator.

Solutions to Problems

A lighting device according to the present technology includes: a light source unit that has a light emitting element; a spatial light phase modulator that generates a plurality of reproduced images at intervals on an image surface by performing spatial light phase modulation on incident light from the light source unit; and a projection unit that superimposes and projects the plurality of reproduced images on a projection surface via different projection lenses.

As a result, the reproduced image is projected onto the projection surface via each pupil position dispersed for each projection lens.

In the above-described lighting device according to the present technology, it is conceivable that the spatial light phase modulator generates each reproduced image using light incident on an area wider than an area formed by equally dividing a phase modulation surface for each reproduced image.

As a result, the diameter of each light beam at the pupil position can be enlarged as compared with a case where the reproduced image is individually generated for each area formed by equally dividing the phase modulation surface according to the number of reproduced images.

The above-described lighting device according to the present technology may include a control unit that changes a position or a shape of the reproduced image by controlling a phase modulation pattern in the spatial light phase modulator.

As the change in the position of the reproduced image, a change in the in-plane direction position or a change in the optical axis direction position is considered. The position of the projection area of the reproduced image can be adjusted depending on the change in the in-plane direction position, and the focus can be adjusted depending on the change in the optical axis direction position. Furthermore, optical aberration can be corrected depending on a change in the shape of the reproduced image.

In the above-described lighting device according to the present technology, it is conceivable that the control unit changes the in-plane direction position of the reproduced image.

As a result, it is possible to adjust the position of the projection area of each reproduced image.

In the above-described lighting device according to the present technology, it is conceivable that the control unit changes the interval in the in-plane direction of the reproduced images according to the projection distance of the reproduced image.

As a result, even when the projection distance changes, it is possible to prevent deviation among the projection areas of the reproduced images.

In the above-described lighting device according to the present technology, it is conceivable that the control unit changes the position of the reproduced image in the optical axis direction.

As a result, it is possible to adjust the focus of the projected image.

In the above-described lighting device according to the present technology, it is conceivable that the control unit changes the position of the reproduced image in the optical axis direction according to the projection distance of the reproduced image.

As a result, it is possible to compensate for the focus shift of the projected image according to the change in the projection distance.

In the above-described lighting device according to the present technology, it is conceivable that the control unit changes the shape of the reproduced image.

As a result, it is possible to change the shape of the reproduced image so as to correct optical aberration such as lens distortion.

In the above-described lighting device according to the present technology, it is conceivable that a diffusion plate is disposed between the image surface and the projection lens in the optical axis direction.

The diffusion plate enlarges a light flux diameter of each light beam incident on the projection lens.

The above-described lighting device according to the present technology may include a bending optical element that bends an incident light beam from the spatial light phase modulator in a direction of increasing an in-plane direction interval of the reproduced images on the image surface.

For example, the in-plane direction interval of the reproduced images on the image surface is increased by a bending optical element such as a prism.

Furthermore, a projector device according to the present technology includes: a light source unit that has a light emitting element; a spatial light phase modulator that generates a plurality of reproduced images at intervals on an image surface by performing spatial light phase modulation on incident light from the light source unit; a projection unit that superimposes and projects the plurality of reproduced images on a projection surface via different projection lenses; and a spatial light intensity modulator that performs spatial light intensity modulation on the reproduced image on the image surface.

Such a projector device can also provide effects similar to those of the lighting device according to the present technology described above.

BRIEF DESCRIPTION OF DRAWINGS

FIGS. 4A and 4B are diagrams illustrating a relationship between a phase distribution of a spatial light phase modulator and a change in a traveling direction of light beams of incident light.

FIG. 5 is an explanatory diagram of a method of dividing a phase modulation surface for each reproduced image.

FIGS. 12A and 12B are explanatory diagrams of an adjustment example of an in-plane direction interval of reproduced images according to a projection distance.

FIGS. 13A and 13B are explanatory diagrams of an adjustment example of an in-plane direction interval of reproduced images according to a projection distance.

MODE FOR CARRYING OUT THE INVENTION

Hereinafter, embodiments according to the present technology will be described in the following order with reference to the accompanying drawings.

<1. First embodiment>

(1-1. Configuration of lighting device and reproduced image projection method as embodiment)

(1-2. Method of generating reproduced image by phase modulation)
(1-3. Method of generating plurality of reproduced images)
<2. Second embodiment>
<3. Third embodiment (application to projector device)>
<4. Modification>
<5. Summary of embodiments>
<6. Present technology>

1. First Embodiment (1-1. Configuration of Lighting Device and Projection Method as Embodiment)

Figure 1:
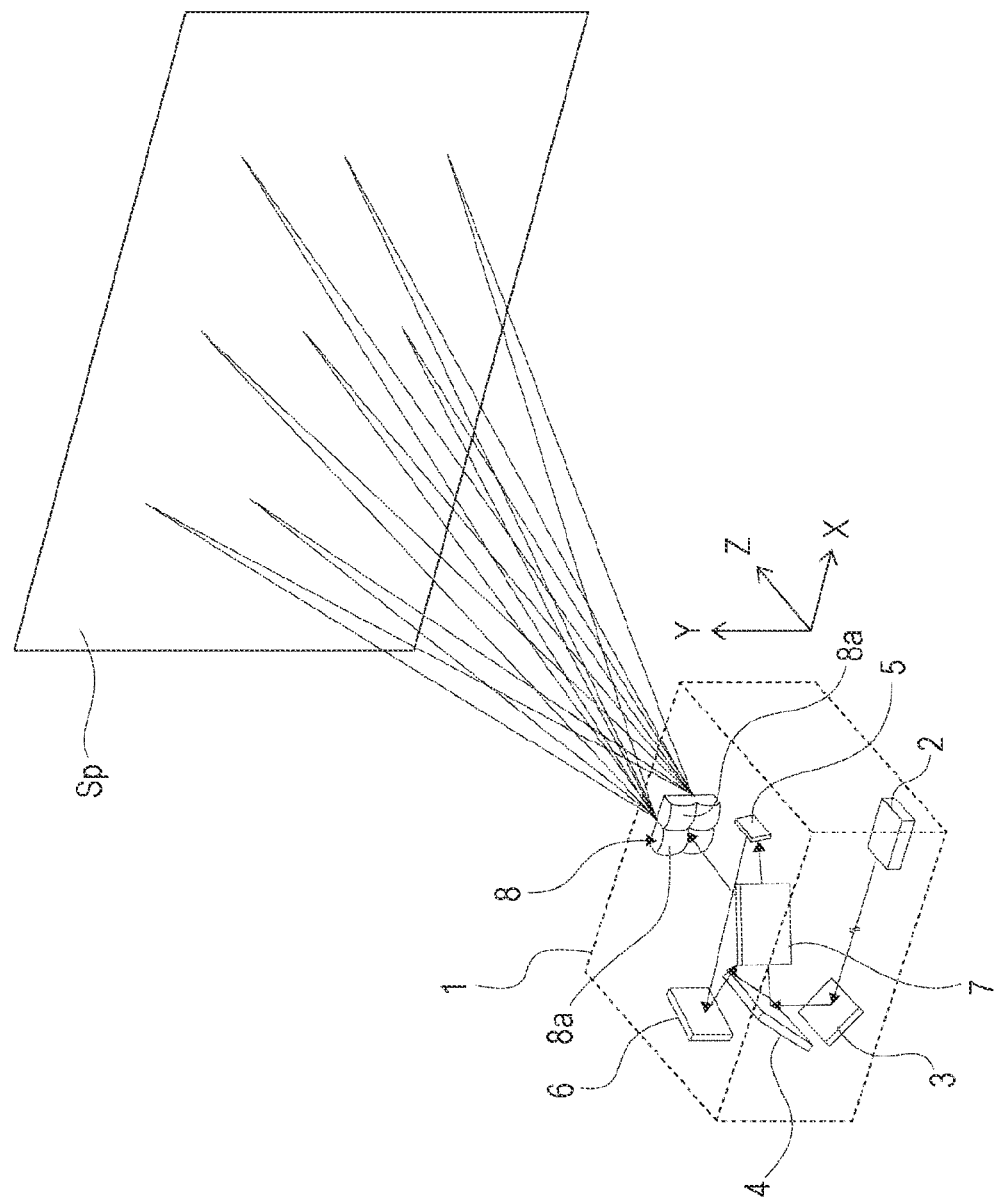
FIG. 1 is a perspective view illustrating a schematic configuration example of an optical system included in a lighting device as a first embodiment according to the present technology.
Figure 2:
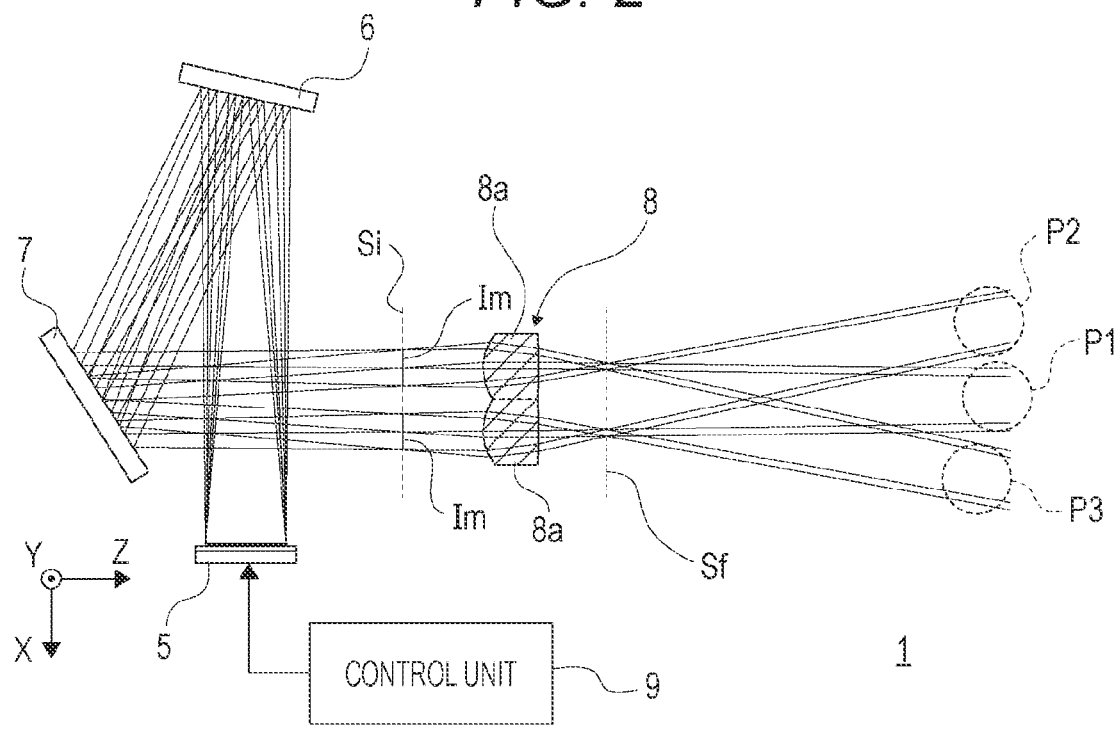
FIG. 2 is a diagram illustrating a schematic configuration of a subsequent stage part of a phase modulator 5 and a configuration of a control system of the phase modulator 5 in the optical system included in the lighting device as the first embodiment.

FIGS. 1 and 2 are diagrams for describing a configuration example of a lighting device 1 as a first embodiment according to the present technology. FIG. 1 is a perspective view illustrating a schematic configuration example of an optical system included in the lighting device 1. FIG. 2 is a diagram illustrating a schematic configuration of a subsequent stage part of a phase modulator 5 in the optical system and a configuration of a control system of the phase modulator 5.

First, as a configuration of the optical system illustrated in FIG. 1, the lighting device 1 includes a light source unit 2, a mirror 3, a mirror 4, the phase modulator 5, a mirror 6, a mirror 7, and a projection lens unit 8. Arrows in the drawing indicate a path of light, and light emitted from the light source unit 2 enters the projection lens unit 8 via the mirror 3, the mirror 4, the phase modulator 5, the mirror 6, and the mirror 7.

In the lighting device 1, the phase modulator 5 performs spatial light phase modulation on the incident light from the light source unit 2 to reproduce a desired image (light intensity distribution) on a projection surface Sp. Such a lighting device 1 can be applied to, for example, various lamps for a vehicle headlamp (headlight) or the like. In the case of application to a head lamp, for example, it is conceivable to adopt a configuration in which the irradiation range of a high beam or a low beam is changed by spatial light phase modulation by the phase modulator 5.

Here, in the following description, a projection direction of an image by the projection lens unit 8 (direction orthogonal to projection surface Sp) is defined as a Z direction. Furthermore, a plane orthogonal to the Z direction (i.e., plane parallel to projection surface Sp) is defined as an X-Y plane. In a state in which the lighting device 1 is disposed horizontally, the X direction coincides with the horizontal direction, and the Y direction coincides with the vertical direction.

The light source unit 2 includes one or a plurality of light emitting elements and functions as a light source of light incident on the phase modulator 5. Examples of the light emitting element of the light source unit 2 include a laser light emitting element. Note that a light emitting diode (LED), a discharge lamp, or the like can also be used as the light emitting element.

The phase modulator 5 includes, for example, a reflective liquid crystal panel, and performs spatial light phase modulation on incident light. Specifically, in the present example, spatial light phase modulation is performed on light emitted from the light source unit 2 and incident via the mirrors 3 and 4.

Note that as the phase modulator 5, a transmissive spatial light phase modulator can be used instead of a reflective type.

Note that hereinafter, "spatial light phase modulation" will also be abbreviated as "phase modulation".

Here, in the lighting device 1 of the present embodiment, the phase modulator 5 generates a plurality of reproduced images Im at intervals on an image surface Si illustrated in FIG. 2 by phase modulation to the incident light. Specifically, in the present example, four reproduced images Im are generated.

The projection lens unit 8 has the same number of projection lenses 8a as the number of the reproduced images Im generated on the image surface Si (i.e., four in present example: see FIG. 1), and each projection lens 8a projects a corresponding one of the generated reproduced images Im on the projection surface Sp. At this time, an aspherical lens is used as each projection lens 8a, and the projection lenses 8a superimpose and project corresponding reproduced images Im on the projection surface Sp. Specifically, the projection lenses 8a in the present example superimpose and project the reproduced images Im on the same area on the projection surface Sp.

As a result, a plurality of reproduced images Im is generated on the image surface Si, but the projected image on the projection surface Sp becomes a single image on which these reproduced images Im are superimposed.

Note that in the present example, the projection lenses 8a are integrally formed in the projection lens unit 8.

Here, the image surface Si illustrated in FIG. 2 can also be referred to as a focal position (focal plane) on the light source side. In FIG. 2, among light beams passing through points in the reproduced image Im, the light beam passing through the image center and the light beam passing through a position having the highest image height are extracted and illustrated. As illustrated, the light beams are guided from the phase modulator 5 to the image surface Si via the mirrors 6 and 7 in the state of convergent light, and are focused on the image surface Si. The light beams focused on the image surface Si are incident on the projection lens 8a in the state of divergent light. The light beams incident on the projection lens 8a are converted into parallel light, and the traveling direction of the light beams other than the light beams at the image center are bent to the light beam side of the image center, whereby the principal rays of the light beams intersect each other at a pupil position Sf.

Of the light beams passing through the pupil position Sf, the light beams at the image center are projected at the same position on the projection surface Sp (set of "p1" in drawing). Similarly, also for light beams passing through positions other than the center in the reproduced image Im, light beams at the same position in the reproduced image Im are projected at the same position on the projection surface Sp (set of "p2" and "p3" in drawing).

As described above, since the phase modulator 5 generates the plurality of reproduced images Im at intervals on the image surface Si and superimposes and projects the reproduced images Im on the projection surface Sp via the separate projection lenses 8a, the reproduced image Im is projected onto the projection surface Sp via each pupil position Sf distributed for each projection lens 8a.

Therefore, in a case where the reproduced image Im is generated using the phase modulator 5, the optical energy density at the pupil position Sf can be reduced, and safety can be improved.

In the present example, the phase modulation pattern by the phase modulator 5 can be arbitrarily set by a control unit 9.

The control unit 9 includes, for example, a microcomputer having a central processing unit (CPU) and storage devices such as a read only memory (ROM) and a random access memory (RAM), and performs overall control of the lighting device 1.

The control unit 9 sets, in the phase modulator 5, a phase modulation pattern (phase distribution) for generating a plurality of reproduced images Im at intervals on the image surface Si. Specifically, the control unit 9 instructs the phase modulator 5 on a drive signal value for each pixel for achieving the above-described phase modulation pattern, and causes the phase modulator 5 to perform spatial light phase modulation on incident light from the light source unit 2.

(1-2. Method of Generating Reproduced Image by Phase Modulation)

A method of generating the reproduced image Im by phase modulation will be described with reference to FIGS. 3 and 4.

Figure 3:
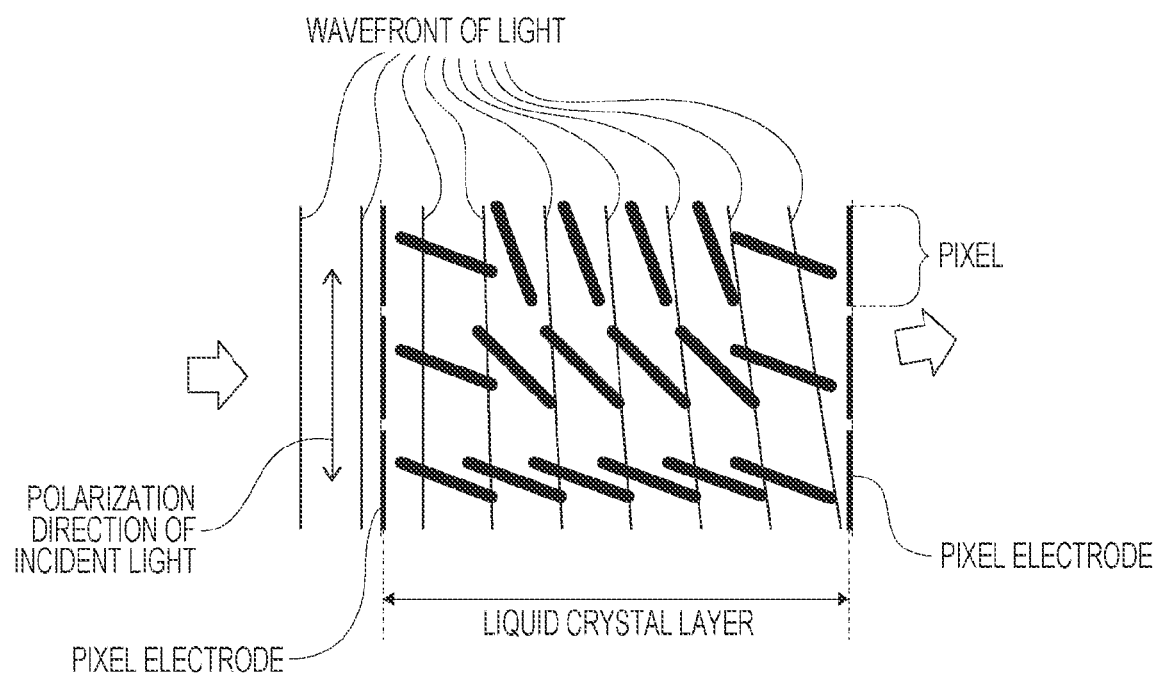
FIG. 3 is a diagram illustrating a state of a cross section of a liquid crystal panel taken along a plane parallel to a thickness direction.

FIG. 3 is an explanatory diagram of a refraction effect of light by the phase modulator 5 including a liquid crystal panel. Note that while an example of a transmissive liquid crystal panel will be described in FIG. 3, the same refraction effect can be obtained even when a reflective liquid crystal panel is used.

FIG. 3 illustrates a cross section of an area for three pixels as a cross section of the liquid crystal panel cut along a plane parallel to the thickness direction. As illustrated in the drawing, in the liquid crystal panel as the phase modulator 5, a pair of pixel electrodes is formed for each pixel at both ends of the liquid crystal layer.

In this liquid crystal panel, the voltage applied between the electrodes can be controlled for each pixel, and the inclination of the liquid crystal molecules in the liquid crystal layer can be changed by the value of the applied voltage. A difference in refractive index occurs due to the state of inclination of liquid crystal molecules, and an optical path length of light passing through the liquid crystal layer changes, whereby a phase difference can be generated. For example, in the illustrated example, with the state of inclination of the liquid crystal molecules of the pixel illustrated at the uppermost stage, the optical path length is long (refractive index is high), and thereafter, the optical path length gets shorter (refractive index becomes lower) from the pixel at the middle stage to the pixel at the lower stage.

In the drawing, the polarization direction of light incident on the liquid crystal panel is represented by a double-headed arrow, and the state of change in the wavefront with advancement of light is represented by a vertical line. By setting the optical path length for each pixel as described above, the wavefront of the incident light in this case gradually inclines rearward from the vertical state as illustrated as the incident light advances in the liquid crystal layer. As a result, as indicated by an outlined arrow in the drawing, the traveling direction of the incident light in this case is changed from a direction parallel to the panel thickness direction to an upward direction.

As described above, in the phase modulator 5, the traveling direction of incident light can be changed by setting the optical path length (i.e., setting the phase) for each pixel.

FIG. 4 illustrates a state of the wavefront of the phase distribution and a state of change in the traveling direction of the light beam (dotted arrow) in a case where the phase distribution as a condensing (Fresnel) lens is set (FIG. 4A) and a case where the phase distribution as a diffraction (prism) lens is set (FIG. 4B).

In the case of the condenser lens illustrated in FIG. 4A, the wavefront of the phase distribution is substantially spherical, and incident light beams are refracted so as to travel in the normal direction of the wavefront of the phase distribution. Therefore, a condensing action as illustrated in the drawing is obtained.

In the case of the diffractive lens illustrated in FIG. 4B, the wavefront of the phase distribution is substantially linear as illustrated, and incident light beams are refracted in the same direction. Therefore, the action of in-plane position movement is obtained as illustrated in the drawing.

By the refraction effect of light as described above, it is possible to form a part where the light beam density increases and a part where the light beam density becomes sparse on the image surface Si. That is, it is possible to generate a desired light intensity distribution (i.e., image) on the image surface Si by setting the phase modulation pattern of the phase modulator 5.

Note that as a method for obtaining a phase distribution for generating a desired reproduced image Im, for example, a Freeform method, represented by a method disclosed in Reference 1 below, or the like can be exemplified.

Reference 1: Published Japanese Translation of PCT International Application No. 2017-520022

(1-3. Method of Generating Plurality of Reproduced Images)

Here, as described above, in the present embodiment, a plurality of reproduced images Im is generated on the image surface Si. In the present example, these reproduced images Im are generated without dividing the phase modulation surface for each reproduced image Im.

This point will be described with reference to FIGS. 5 to 9.

FIG. 5 is a diagram for describing a method of dividing a phase modulation surface Sm of the phase modulator 5 for each reproduced image Im in generating a plurality of reproduced images Im.

Here, the phase modulation surface Sm refers to an emission surface of a part of the phase modulator 5 capable of performing phase modulation. The part capable of performing phase modulation refers to a part in which phase modulation can be performed on incident light.

The four reproduced images Im to be generated are denoted by "A", "B", "C", and "D". In the method of performing division for each reproduced image Im, as illustrated in FIGS. 5A to 5D, the phase modulation surface Sm is equally divided (formed areas are defined as areas a, b, c, and d) for each reproduced image Im to be generated, and one corresponding reproduced image Im is generated for each equally divided area on the image surface Si.

Figure 6:
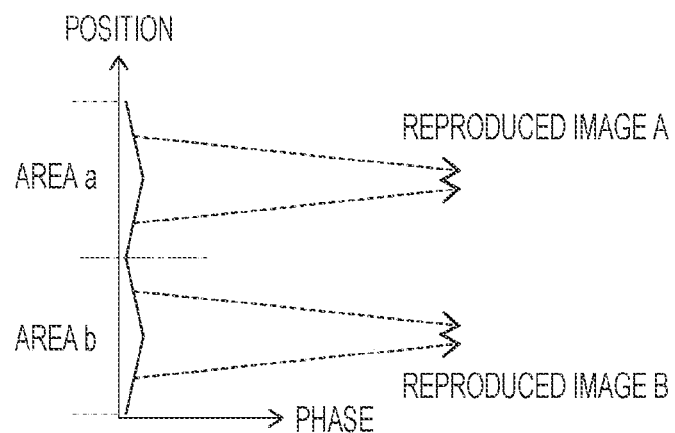
FIG. 6 is a diagram schematically illustrating the shape of a wavefront of a phase distribution in a case where division is performed for each reproduced image.

FIG. 6 schematically illustrates the shape of the wavefront of the phase distribution in the case where division is performed for each reproduced image Im. Note that FIG. 6 representatively illustrates the shape of the wavefront of the phase distribution only for the area a and the area b.

As illustrated in FIG. 6, the method of performing division for each reproduced image Im is a method of setting a phase distribution pattern for generating the reproduced image Im for each area equally divided for each reproduced image Im and performing phase modulation.

Figure 7:
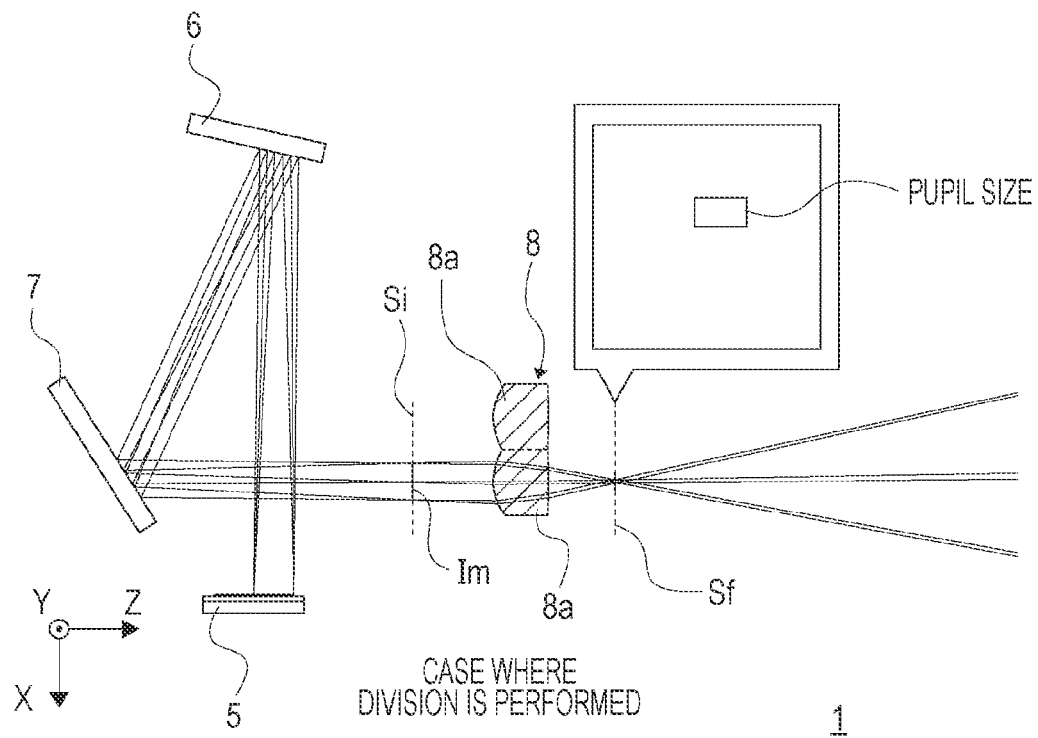
FIG. 7 is a diagram illustrating a state of light beams in a case where division is performed for each reproduced image.

FIG. 7 is a diagram illustrating a state of light beams in the case where division is performed for each reproduced image Im. Note that FIG. 7 illustrates only the light beams for any one of the four reproduced images Im "A" to "D".

In the case where division is performed for each reproduced image Im, each reproduced image Im is generated using light incident on ¼ of the entire area of the phase modulation surface Sm. Since the area of the phase modulation surface Sm available for generation of one reproduced image Im is relatively narrow, the diameter of each light beam from the phase modulator 5 until the light beam reaches the image surface Si tends to narrow, and as a result, the pupil diameter decreases.

The decrease in the pupil diameter means that the optical energy density at the pupil position Sf increases. Therefore, in the present example, a method of generating a plurality of reproduced images Im without performing division for each reproduced image Im is adopted.

Figure 8:
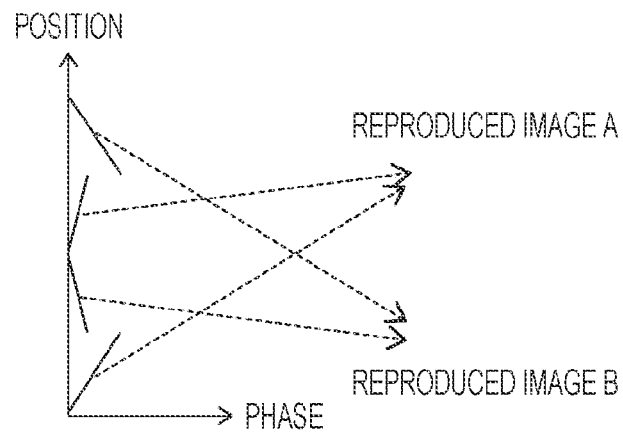
FIG. 8 is a diagram schematically illustrating an example of a wavefront shape of a phase distribution in a case where division is not performed for each reproduced image.

FIG. 8 schematically illustrates an example of a wavefront shape of a phase distribution in a case where division is not performed for each reproduced image Im.

In the drawing, an example of the wavefront shape of the phase distribution for generating the reproduced images Im of "A" and "B" is schematically illustrated. However, as long as the division is not performed for each reproduced image Im as illustrated in the drawing, the generation of each reproduced image Im is not limited to within the range of the equally divided area as illustrated in FIG. 5, and it is possible to generate each reproduced image Im using light incident on a wider area beyond the range of the equally divided area.

In the present example, since division is not performed for each reproduced image Im, each reproduced image Im is generated using light incident on an area wider than an area formed by equally dividing the phase modulation surface Sm for each reproduced image Im.

That is, the control unit 9 of the present example sets, in the phase modulator 5, the phase modulation pattern calculated so as to be able to generate each reproduced image Im using light incident on an area wider than an area formed by equally dividing the phase modulation surface Sm for each reproduced image Im in this manner, and causes the phase modulator 5 to perform phase modulation on the incident light from the light source unit 2.

Figure 9:
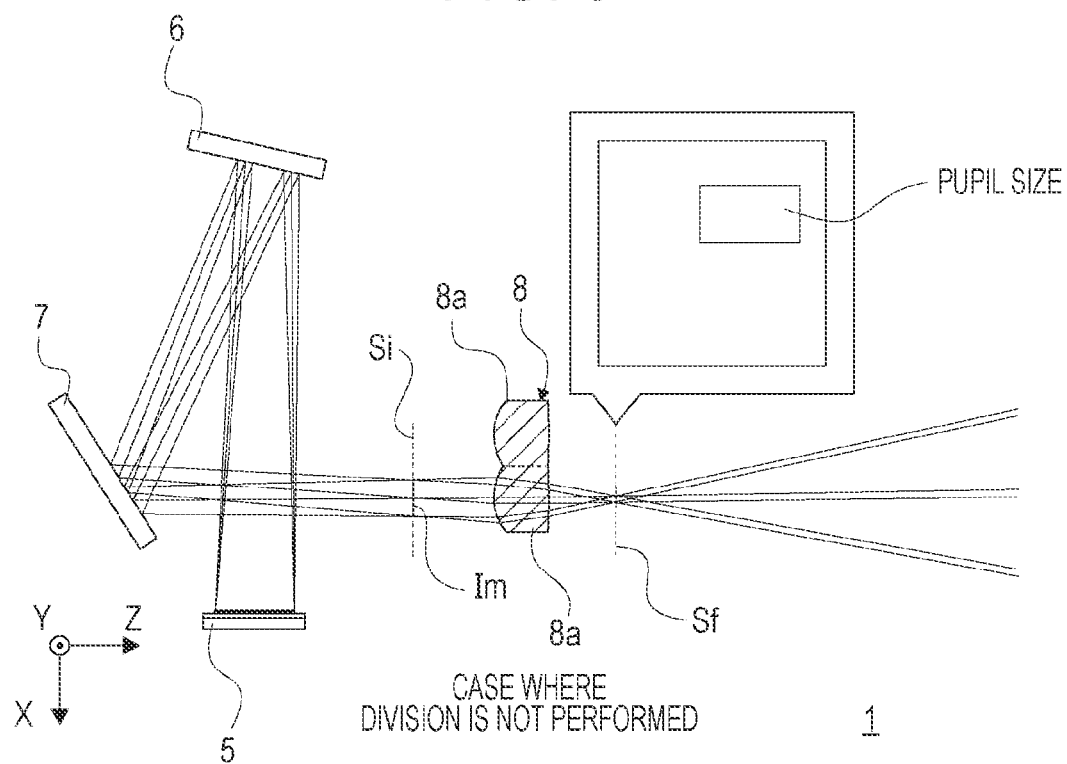
FIG. 9 is a diagram illustrating a state of light beams in a case where division is not performed for each reproduced image.

FIG. 9 is a diagram illustrating a state of light beams in a case where division is not performed for each reproduced image Im, that is, in a case where the method of generating each reproduced image Im using light incident on an area wider than an area formed by equally dividing the phase modulation surface Sm for each reproduced image Im is adopted. Note that similarly to FIG. 7 described above, FIG. 9 also illustrates only the light beams for any one of the four reproduced images Im "A" to "D".

Since the reproduced image Im in this case is generated using light incident on an area wider than the equally divided area, the diameter of each light beam from the phase modulator 5 until the light beam reaches the image surface Si tends to be larger than that in the case of FIG. 7, and as a result, the pupil diameter can be enlarged.

By enlarging the pupil diameter, the optical energy density at the pupil position Sf can be reduced, and safety can be enhanced.

2. Second Embodiment

Next, a second embodiment will be described.

In the second embodiment, the position or shape of a reproduced image Im is changed.

Figure 10:
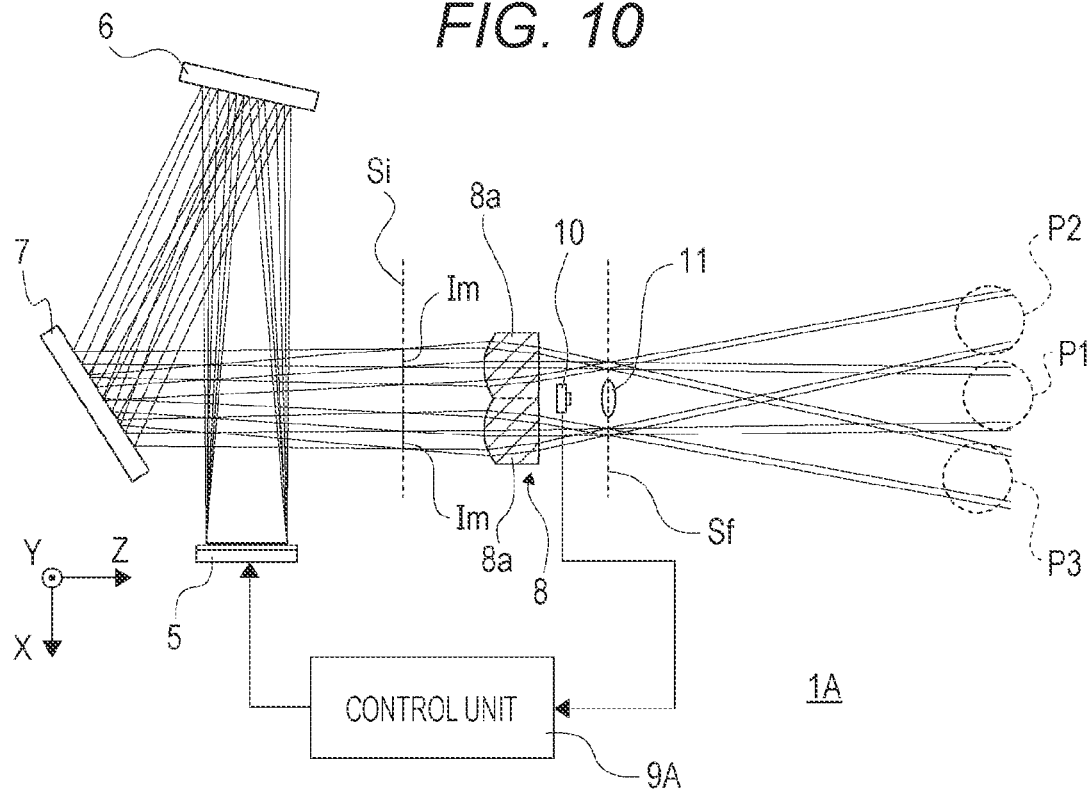
FIG. 10 is a diagram for describing a configuration example of a lighting device as a second embodiment.

FIG. 10 is a diagram for describing a configuration example of a lighting device 1A as a second embodiment. Note that similarly to FIG. 2 described above, FIG. 10 illustrates only the configuration of the optical system subsequent to the phase modulator 5. The other parts including a light source unit 2 in the optical system are similar to those in FIG. 1, and thus are not illustrated.

Furthermore, in the following description, the same reference numerals are given to parts similar to those already described, and description thereof is omitted.

The difference from the lighting device 1 as the first embodiment is that a distance measuring sensor 10 and a condenser lens 11 are added, and a control unit 9A is provided instead of the control unit 9.

The distance measuring sensor 10 measures a distance to an object in the Z direction. As the distance measuring sensor 10, for example, a distance measuring sensor by an indirect time of flight (ToF) method or a direct ToF method, a distance measuring sensor by a structured light method, or the like can be used. In the present example, the distance measuring sensor 10 by the indirect ToF method is used. In this case, the distance measuring sensor 10 receives light projected through a projection lens unit 8 and reflected by an object, and measures the distance to the object.

The condenser lens 11 condenses reflected light from the object and guides the light onto a sensor surface of the distance measuring sensor 10.

Here, in the present example, a distance measuring unit including the distance measuring sensor 10 and the condenser lens 11 is arranged such that its optical axis coincides with the optical axis of a projection lens unit 8, that is, the optical axis of a projection optical system that superimposes and projects each reproduced image Im.

Figure 11:
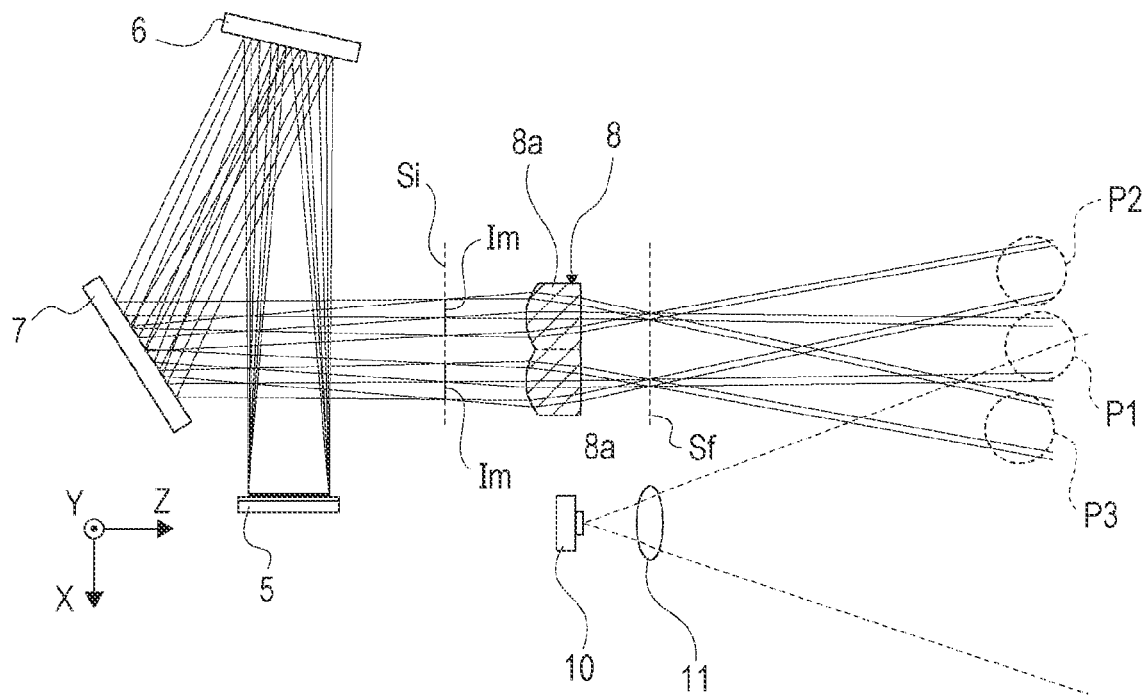
FIG. 11 is a diagram illustrating an example of a case where a distance measuring unit is arranged with a certain distance between optical axes of the distance measuring unit and a projection optical system of a reproduced image.

FIG. 11 illustrates a case where the distance measuring unit is arranged with a certain distance between the optical axes of the distance measuring unit and the projection optical system. However, with such an arrangement, a visual field (distance measuring visual field) by the distance measuring unit and the projection area of the reproduced image Im deviate from each other, and a so-called shadow area that is not irradiated with light for distance measurement is formed in the distance measuring visual field.

By arranging the distance measuring unit such that the optical axis coincides with that of the projection optical system as described above, it is possible to prevent such a shadow area from occurring.

In FIG. 10, the control unit 9A is different from the control unit 9 in that the control unit 9A controls the phase modulation pattern for changing the in-plane direction position and the optical axis direction position of each reproduced image Im according to the distance to a projection surface Sp (hereinafter referred to as "projection distance") measured by the distance measuring sensor 10 as described below.

Here, in a state where the reproduced images Im are superimposed and projected on the same area on the projection surface Sp, when the projection distance changes, a deviation occurs among the projection areas of the reproduced images Im on the projection surface Sp. That is, blurring (deterioration in resolution) occurs in the projected image.

Therefore, in the present example, as illustrated in FIGS. 12 and 13, the in-plane direction interval of the reproduced images Im on an image surface Si is changed according to the projection distance.

FIG. 12 illustrates an example of the center-to-center distances of the reproduced images Im to be set on the image surface Si corresponding to a projection distance of 200 mm, and FIG. 13 illustrates an example of the center-to-center distances of the reproduced images Im to be set on the image surface Si corresponding to a projection distance of 2000 mm.

Specifically, in this example, the center-to-center distance of the reproduced images Im corresponding to the projection distance=200 mm illustrated in FIG. 12A is 6.54 mm in both the X direction and the Y direction as illustrated in FIG. 12B, whereas the center-to-center distance of the reproduced images Im corresponding to the projection distance=2000 mm illustrated in FIG. 13A is 6.26 mm in both the X direction and the Y direction as illustrated in FIG. 13B.

As in this example, as the projection distance increases, the center-to-center distance of the reproduced images Im on the image surface Si is increased. As a result, even if the projection distance changes, it is possible to prevent deviation among the projection areas of the reproduced images Im, and it is possible to prevent the resolution of the projected image from deteriorating due to the projection distance.

Furthermore, in the present example, in addition to such control of the center-to-center distance of the reproduced images Im, control of changing the shape of the reproduced images Im is also performed. Specifically, control is performed to change the shape of each reproduced image Im so as to achieve lens distortion correction. Note that the lens distortion referred to here is lens distortion caused by the projection lens 8a.

In this case, since the lens distortion appears as a pincushion aberration, the lens distortion correction is performed by changing the shape of the reproduced image, which should originally be rectangular, so as to be distorted into a barrel shape (see FIGS. 12B and 13B).

Figure 14:
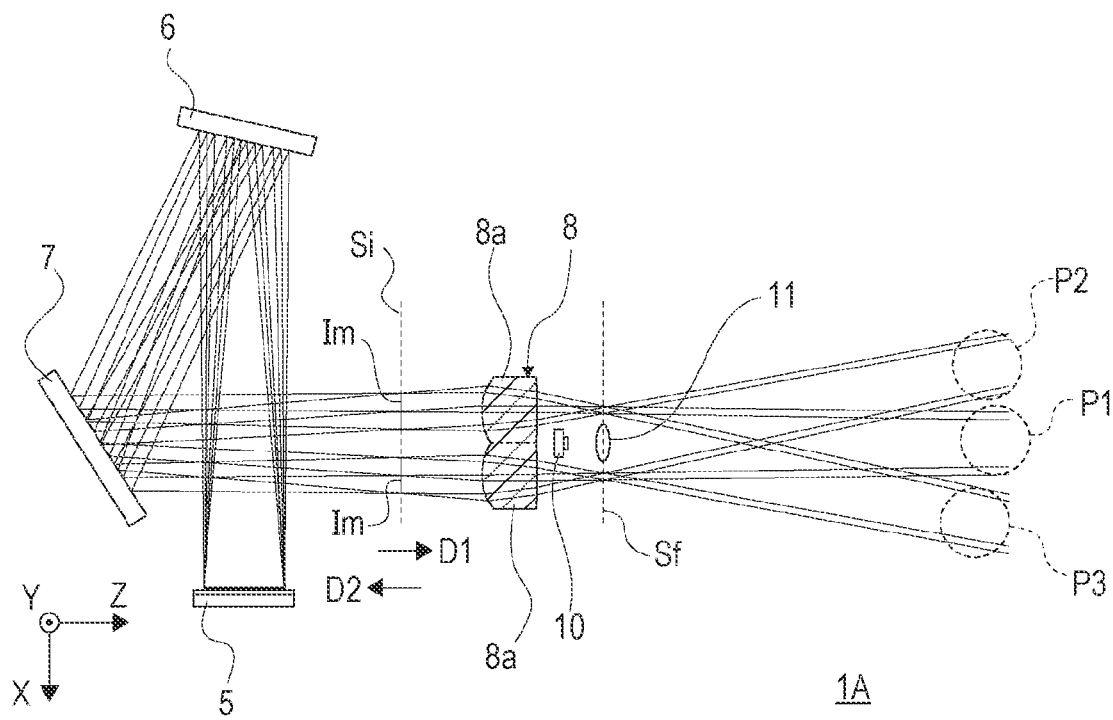
FIG. 14 is an explanatory diagram of an adjustment example of the position of each reproduced image in the optical axis direction according to a projection distance.

Furthermore, in the present example, control is performed to change the position of each reproduced image Im in the optical axis direction according to the projection distance. That is, each reproduced image Im is moved in a direction indicated as direction D1 or direction D2 in FIG. 14. This corresponds to performing focus adjustment of the projected image.

Specifically, the control unit 9A moves each reproduced image Im in a direction away from the projection lens unit 8 (direction D2) as the projection distance decreases.

As a result, it is possible to compensate for the focus shift of the projected image according to the change in the projection distance.

Figure 15:
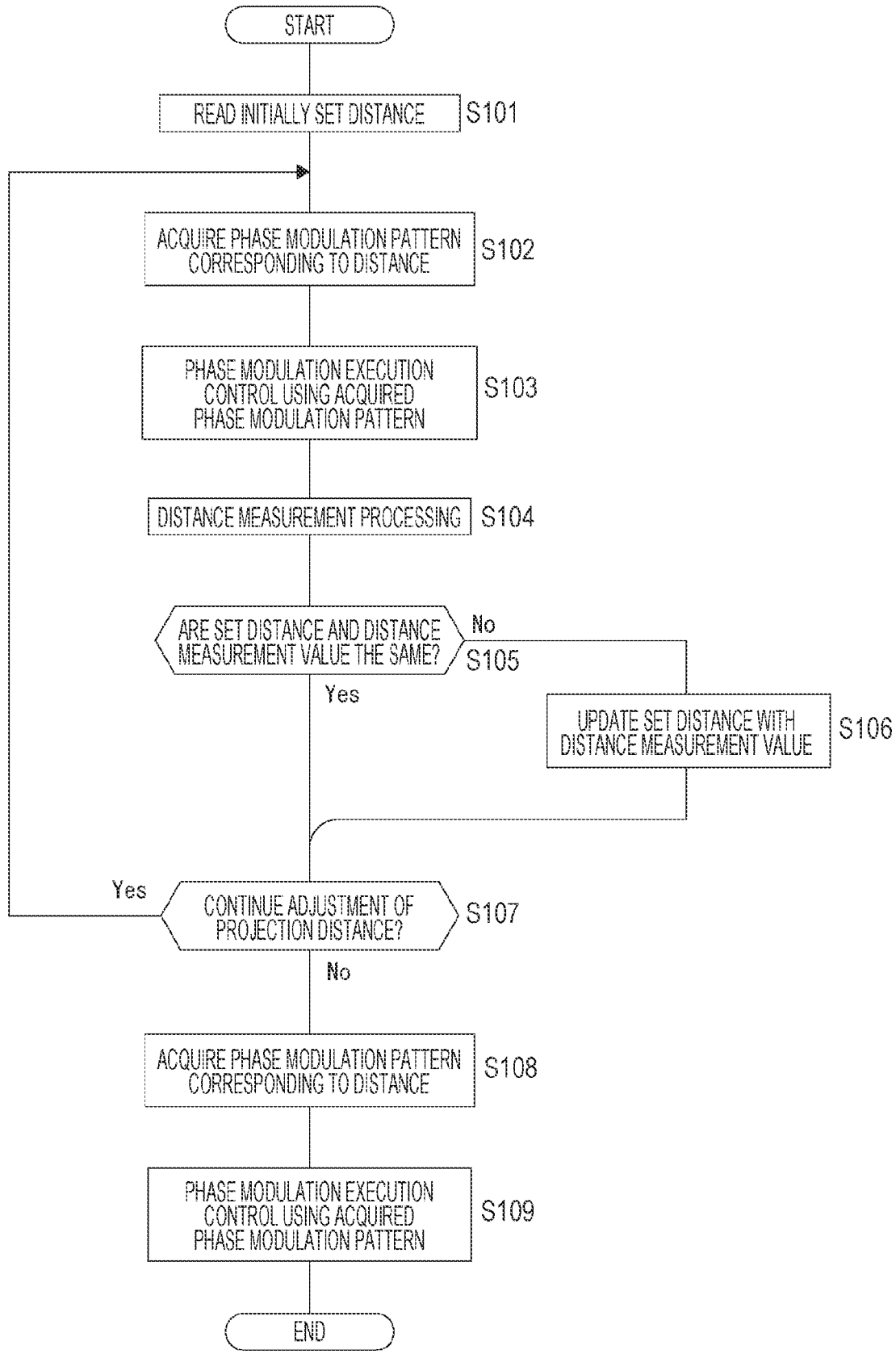
FIG. 15 is a flowchart illustrating an example of a specific processing procedure to be performed to achieve control as the second embodiment.

FIG. 15 is a flowchart illustrating an example of a specific processing procedure to be performed by the control unit 9A in order to achieve the control as the second embodiment described above.

First, in step S101, the control unit 9A reads an initially set distance. The initially set distance mentioned here is an initially set value of the projection distance. The information indicating the initially set distance is stored in a storage device readable by the control unit 9A, and the control unit 9A performs processing of reading the information on the initially set distance stored in the storage device in step S101.

In step S102 following step S101, the control unit 9A acquires a phase modulation pattern corresponding to the distance. That is, a phase modulation pattern corresponding to the initially set distance read in step S101 or a phase modulation pattern corresponding to the distance updated in step S106 described below is acquired.

As the phase modulation pattern here, a phase modulation pattern calculated so as to achieve adjustment of the in-plane direction interval of the reproduced images Im, focus adjustment (adjustment of optical axis direction position), and lens distortion correction according to the projection distance as described above with reference to FIGS. 12 to 14 is used.

In the present example, the information indicating the phase modulation pattern for each projection distance is stored in a storage device readable by the control unit 9A, and the control unit 9A reads and acquires the information of the phase modulation pattern stored in the storage device.

In step S103 following step S102, the control unit 9A performs phase modulation execution control using the acquired phase modulation pattern. That is, the acquired phase modulation pattern is set in the phase modulator 5 to perform phase modulation.

Then, in subsequent step S104, the control unit 9A causes the distance measuring sensor 10 to execute distance measurement as distance measurement processing, and further determines in subsequent step S105 whether or not the set distance and the distance measurement value are equal, that is, whether or not the value of the distance measured in the distance measurement processing in step S104 is equal to the set distance (Initially set distance in step S101 or distance value updated in step S106 described below).

In a case where it is determined in step S105 that the set distance and the distance measurement value are equal, the control unit 9A advances the processing to step S107.

On the other hand, in a case where it is determined in step S105 that the set distance and the distance measurement value are not equal, the control unit 9A proceeds to step S106, updates the set distance with the distance measurement value, and advances the processing to step S107.

In step S107, the control unit 9A determines whether or not to continue adjustment of the projection distance. The determination processing in step S107 functions as processing of determining whether or not the projection distance is in a changeable state after the phase modulation corresponding to the initially set distance is performed in step S103 described above.

Various specific examples of the determination as to whether or not to continue adjustment of the projection distance can be considered. For example, in a case where the control unit 9A has a function of setting the position of the projection surface Sp at an arbitrary position in the Z direction, the control unit 9A performs processing of determining whether or not the projection distance should be changed by the function. Alternatively, it is also conceivable that the projection distance changes as the user adjusts the arrangement position of the lighting device 1A. In that case, for example, it is conceivable to perform determination as to whether or not an adjustment mode of the arrangement position is being performed.

In a case where it is determined to continue adjustment of the projection distance in step S107, the control unit 9A returns to step S102. As a result, in a case where it is estimated that the state in which the projection distance changes can be continued, if it is determined that the projection distance has changed by distance measurement (S105: No), the reproduced image Im generated with the phase modulation pattern corresponding to the changed projection distance is projected (S102, S103). That is, adjustment of the in-plane direction interval of the reproduced images Im and focus adjustment according to the changed projection distance are achieved. Note that in a case where the projection distance does not change from the value before distance measurement in step S104, the projection state of the reproduced image Im generated with the phase modulation pattern corresponding to the value before distance measurement is continued.

On the other hand, in a case where it is determined not to continue adjustment of the projection distance in step S107, the control unit 9A proceeds to step S108, acquires the phase modulation pattern corresponding to the distance, and then performs the phase modulation execution control by the acquired phase modulation pattern in subsequent step S109.

The acquisition processing in step S108 and the control processing in step S109 are the same processing as the acquisition processing in step S102 and the control processing in step S103 described above, respectively, and redundant description is avoided.

The control unit 9A terminates the series of processing illustrated in FIG. 15 in response to the execution of the control processing of step S109.

Note that in the above description, an example has been described in which the information of the phase modulation pattern stored in advance in the storage device is read and acquired as the processing of acquiring the phase modulation pattern corresponding to the projection distance (including initially set distance of step S101). However, as a matter of course, the phase modulation pattern corresponding to the projection distance can be acquired by performing calculation based on the above-described Freeform method or the like.

3. Third Embodiment (Application to Projector Device)

In a third embodiment, the lighting device as the embodiment described above is applied to a projector device.

Figure 16:
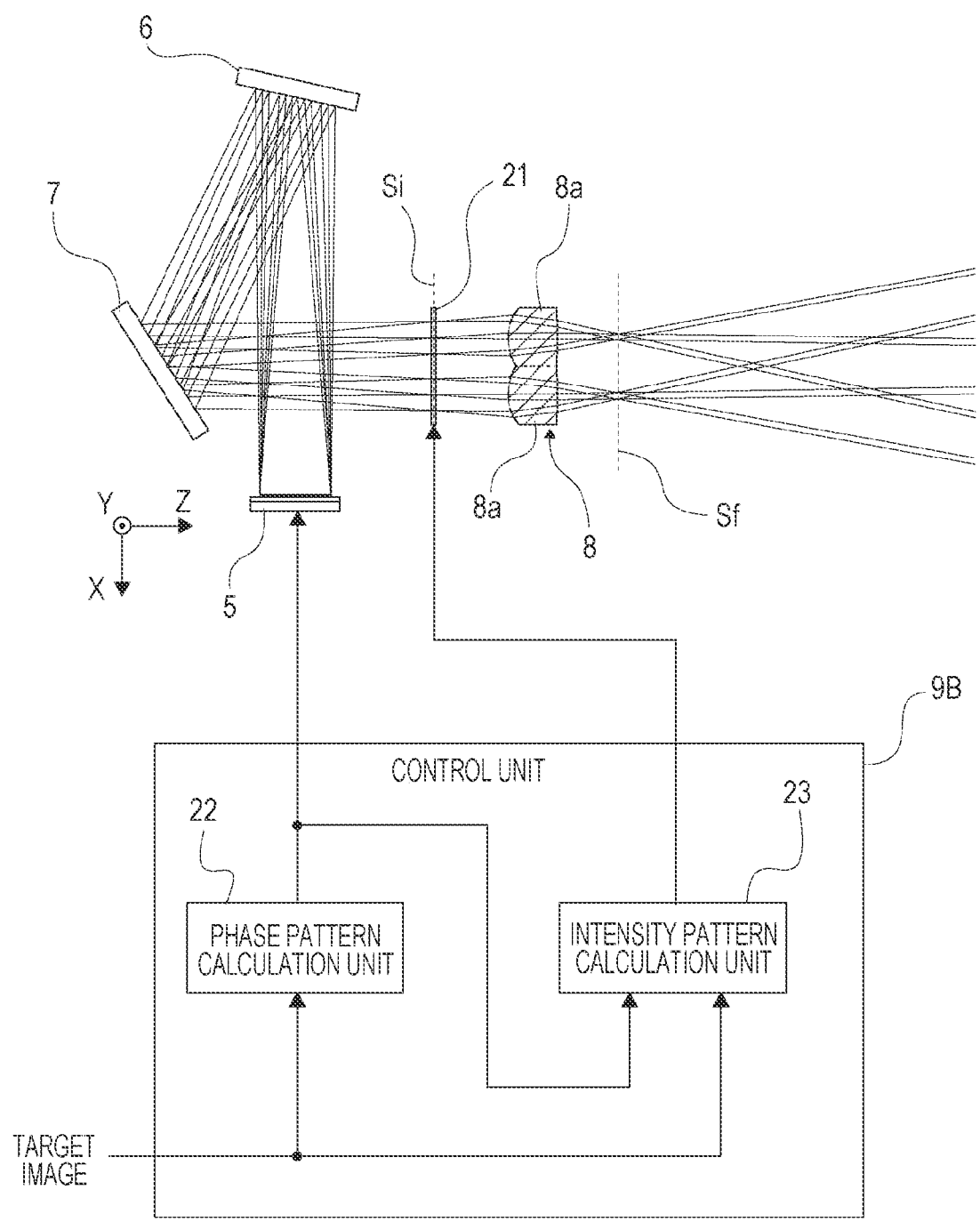
FIG. 16 is a diagram for describing a configuration example of a projector device as an embodiment.

FIG. 16 is a diagram for describing a configuration example of a projector device 20 to which the lighting device 1 as the first embodiment is applied. Note that in FIG. 16, similarly to FIG. 2 described above, only the configuration of the optical system subsequent to a phase modulator 5 is illustrated, and the other parts of the optical system including a light source unit 2 are similar to those in FIG. 1, and thus are not illustrated.

As illustrated, the projector device 20 is different from the lighting device 1 of the first embodiment in that an intensity modulator 21 is provided at the position of the image surface Si and a control unit 9B is provided instead of the control unit 9.

The intensity modulator 21 includes, for example, a transmissive liquid crystal panel, and performs spatial light intensity modulation (hereinafter also abbreviated as "intensity modulation") on incident light. Specifically, the intensity modulator 21 is arranged at the position of the image surface Si to perform the intensity modulation on each reproduced image Im generated by phase modulation by the phase modulator 5.

Similarly to the control unit 9, the control unit 9B includes a microcomputer having a CPU and a storage device such as a ROM and a RAM. The control unit 9B calculates a phase distribution (phase modulation pattern) of the phase modulator 5 and a light intensity distribution (intensity modulation pattern) of the intensity modulator 21 on the basis of a target image, controls a phase modulation operation by the phase modulator 5 on the basis of the calculated phase distribution, and controls an intensity modulation operation by the intensity modulator 21 on the basis of the calculated light intensity distribution.

As illustrated, the control unit 9B includes a phase pattern calculation unit 22 and an intensity pattern calculation unit 23. The phase pattern calculation unit 22 calculates a phase modulation pattern for generating a plurality of reproduced images Im (four in present example) having a light intensity distribution as a target image at intervals on the image surface Si.

The intensity pattern calculation unit 23 calculates an intensity modulation pattern to be set in the intensity modulator 21 in order to reproduce the light intensity distribution of the target image on a projection surface Sp. Specifically, the intensity pattern calculation unit 23 inputs the target image and the phase modulation pattern calculated by the phase pattern calculation unit 22, and calculates an intensity modulation pattern of the intensity modulator 21 on the basis of the target image and the phase modulation pattern. More specifically, the intensity pattern calculation unit 23 calculates the intensity modulation pattern of the intensity modulator 21 for eliminating the difference between the light intensity distribution of the reproduced images Im obtained from the phase modulation pattern input from the phase pattern calculation unit 22 and the light intensity distribution of the target image. This corresponds to calculating an intensity modulation pattern for compensating for the high-frequency component since the reproducibility of the high-frequency component in the target image tends to decrease in the reproduced image Im generated by the phase modulation.

The control unit 9B causes the phase modulator 5 to perform the phase modulation operation using the phase modulation pattern calculated by the phase pattern calculation unit 22, and causes the intensity modulator 21 to perform the intensity modulation operation using the intensity modulation pattern calculated by the intensity pattern calculation unit 23.

Here, in a conventional projector device, a reproduced image is obtained by performing spatial light intensity modulation by a spatial light intensity modulator on light from a light source. However, in the spatial light intensity modulation, a part of incident light from the light source is shielded or dimmed. Therefore, there has been a circumstance that utilization efficiency of light is low and it is difficult to achieve high contrast.

On the other hand, as illustrated in FIG. 16, by using the lighting device 1, that is, a projector device to which a lighting device that reproduces a desired light intensity distribution by spatial light phase modulation is applied, it is possible to improve utilization efficiency of light and to improve contrast of a projected image. In the configuration illustrated in FIG. 16, reproducing the light intensity distribution corresponding to the target image on the modulation surface of the intensity modulator 21 by the phase modulation of the phase modulator 5 corresponds to forming a rough light intensity distribution of the target image before the intensity modulation by the intensity modulator 21 is performed, and is control similar to area division driving of a backlight in a liquid crystal display. Note, however, that since the light intensity distribution here is formed by phase modulation, it is possible to prevent a decrease in the utilization efficiency of light from the light source.

The intensity modulator 21 in this case functions to adjust details of a reproduced image Im of a so-called low-frequency image reproduced by the phase modulator 5 and reproduce a light intensity distribution corresponding to the target image on the projection surface Sp. As a result, it is possible to increase the contrast of the projected image while curbing the reduction in resolution of the projected image.

Note that a configuration to which the lighting device 1A as the second embodiment is applied can also be adopted as the projector device. In that case, the phase pattern calculation unit 22 calculates the phase modulation pattern for adjusting the in-plane direction interval of the reproduced images Im and adjusting the focus according to the distance (projection distance) measured by the distance measuring sensor 10.

Furthermore, in the above description, an example of using a transmissive liquid crystal panel as the intensity modulator 21 has been described. However, a reflective liquid crystal panel or a reflective spatial light modulator such as a DMD can also be used.

4. Modification

Here, the embodiment is not limited to the specific examples described above, and configurations as various modifications can be adopted.

Figure 17:
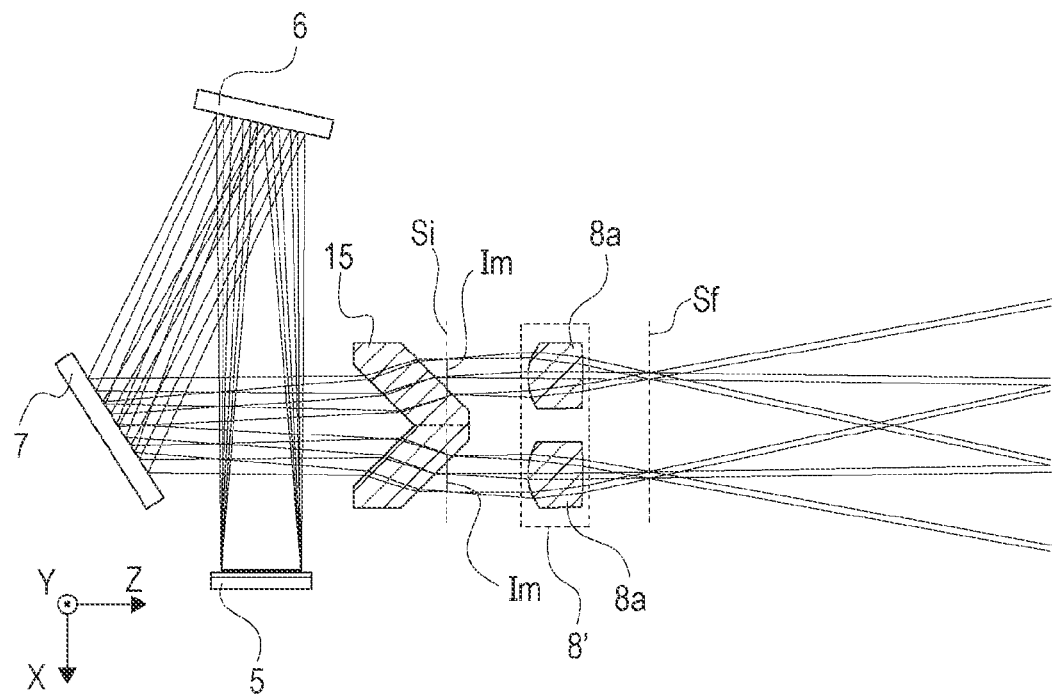
FIG. 17 is an explanatory diagram of an example using a bending optical element.

For example, the optical system may include a bending optical element 15 as illustrated in FIG. 17. The bending optical element 15 bends the incident light beam from the phase modulator 5 in a direction in which the in-plane direction interval of the reproduced images Im on the image surface Si is increased, and for example, a prism can be used.

By increasing the in-plane direction interval of the reproduced images Im, in a case where there is a component required to be arranged in the vicinity of the optical axis of the projection optical system that superimposes and projects the reproduced images Im, the space for arranging the component can be enlarged, and the component can be easily arranged.

Figure 18:
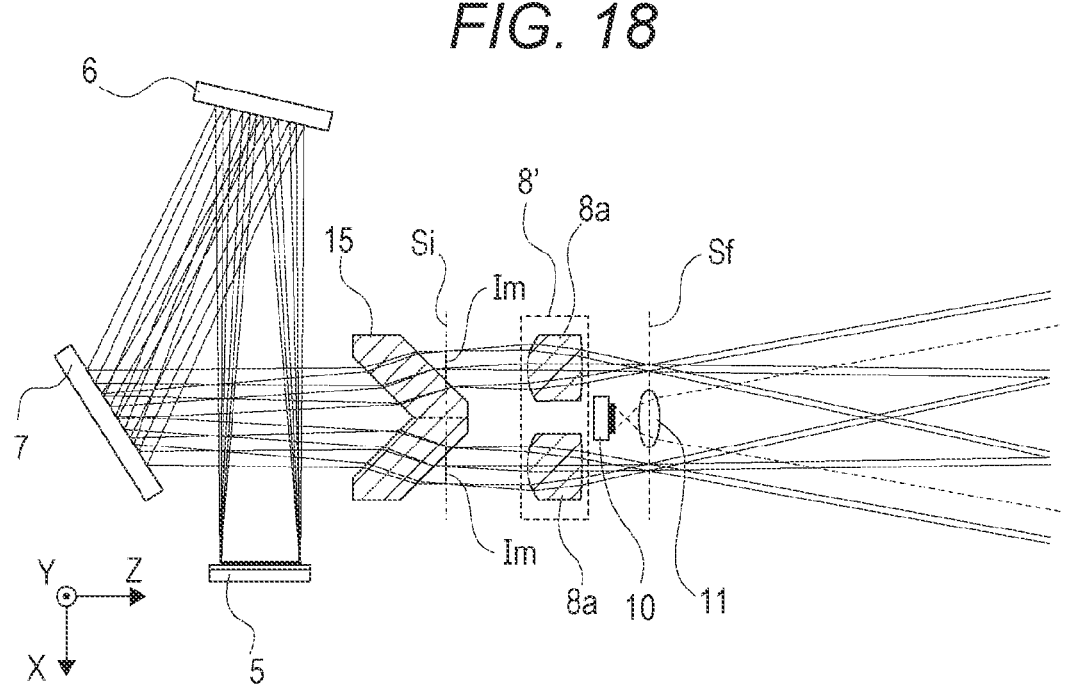
FIG. 18 is an explanatory diagram of an example in which a distance measuring unit is arranged in a space generated by application of a bending optical element.

For example, as illustrated in FIG. 18, the distance measuring unit (distance measuring sensor 10 and condenser lens 11) described in the second embodiment can be easily arranged in a position near the optical axis.

Note that in a case where the in-plane direction interval of the reproduced images Im is increased by the bending optical element 15, it is also possible to adopt a configuration in which the projection lenses 8a are separated as in a projection lens unit 8' illustrated in FIGS. 17 and 18.

Furthermore, the component arranged in the space generated by the increase of the in-plane direction interval of the reproduced images Im is not limited to the above-described distance measuring unit, and for example, other components such as an imaging unit including an image sensor that captures an image and an imaging lens can be used.

Furthermore, in the above description, an example in which a reflective liquid crystal panel is used as the phase modulator 5 has been described. However, in a case where a reflective spatial light phase modulator is used as the phase modulator 5, the phase modulation surface Sm is arranged to be inclined from a state orthogonal to the incident optical axis. Therefore, as illustrated in FIGS. 19A and 19B, the distance from the phase modulation surface Sm to the reproduced image Im varies depending on the area of the phase modulation surface Sm at which the modulation is received.

Figure 19A:
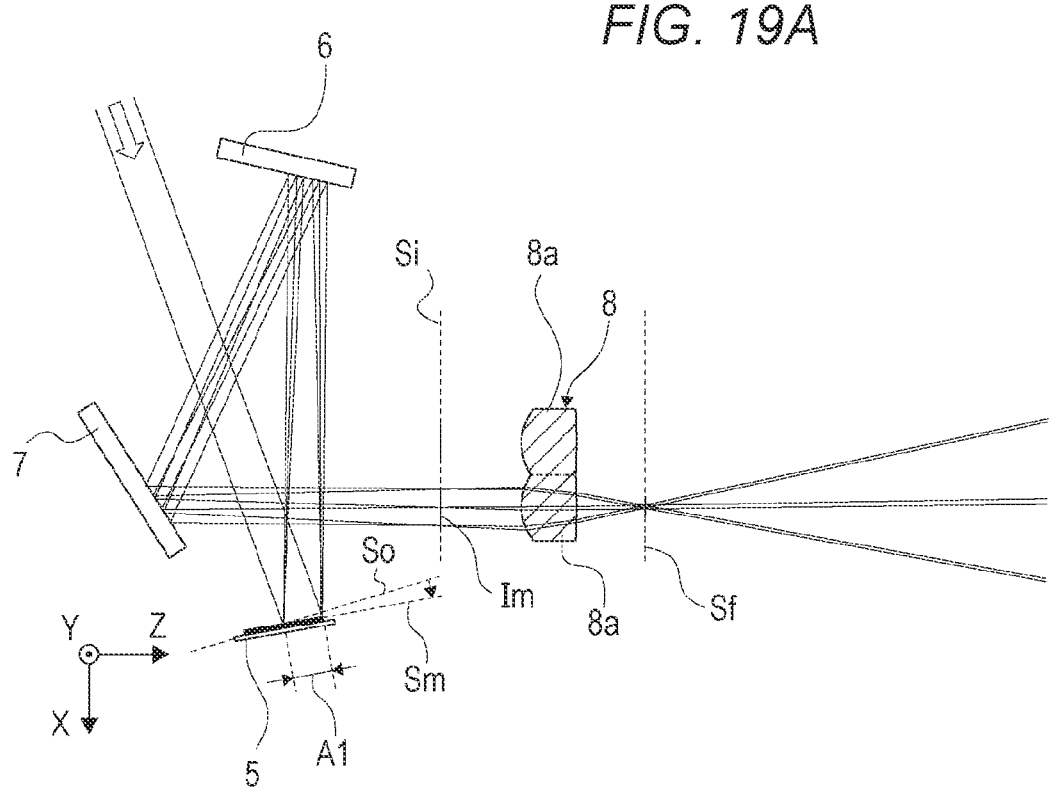
FIGS. 19A and 19B are explanatory diagrams of a problem in a case where the spatial light phase modulator is obliquely arranged.
Figure 19B:
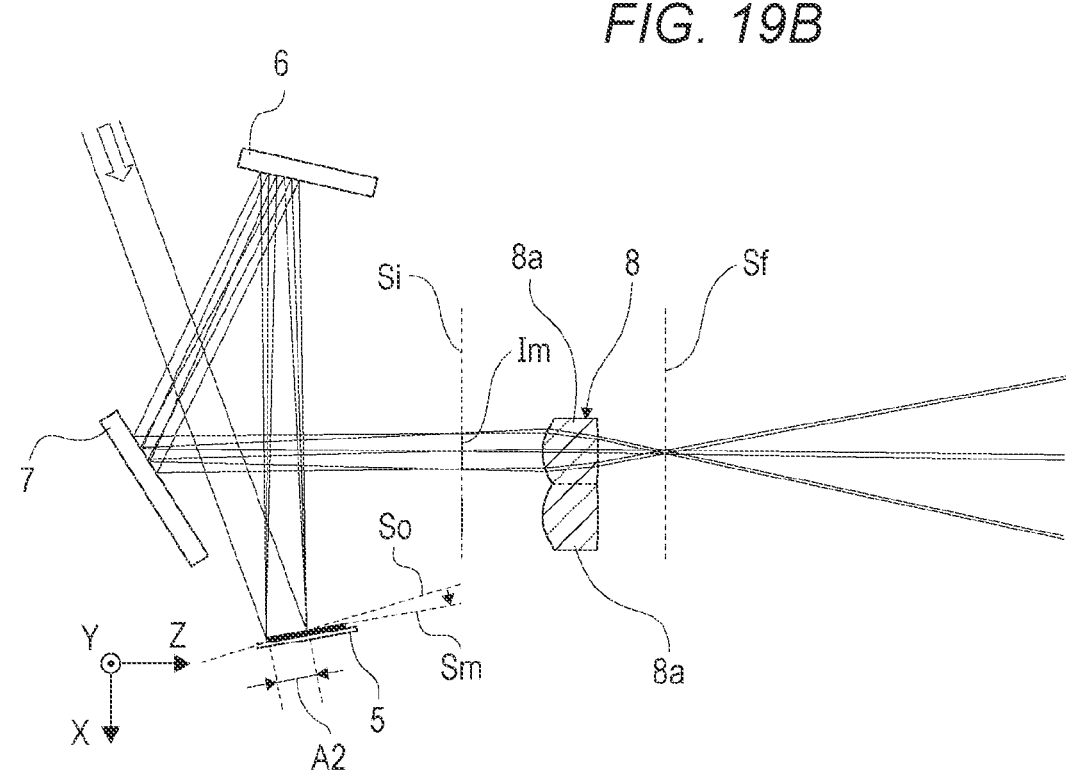

Specifically, FIGS. 19A and 19B illustrate that the phase modulator 5 is arranged such that the phase modulation surface Sm is inclined with respect to a plane So orthogonal to the incident optical axis. In this case, the distance (optical path length) from the phase modulation surface Sm to the reproduced image Im is different between the light modulated in area A1 illustrated in FIG. 19A and the light modulated in area A2 illustrated in FIG. 19B. Specifically, the distance to the reproduced image Im is longer in FIG. 19B than in FIG. 19A.

Therefore, the reproduced image Im is generated using the phase modulation pattern calculated so as to cancel the difference in distance in the case where the phase modulator 5 is obliquely arranged as described above. As a result, the positions of the reproduced images Im in the Z direction can be aligned.

Figure 20:
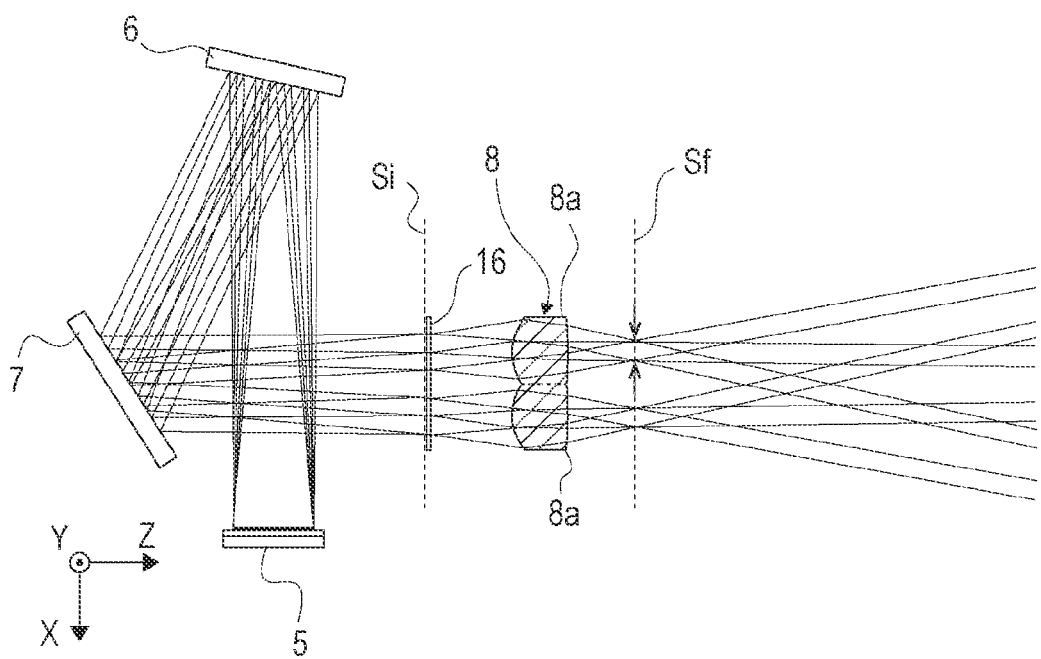
FIG. 20 is an explanatory diagram of an example of applying a diffusion plate.
Figure 21:
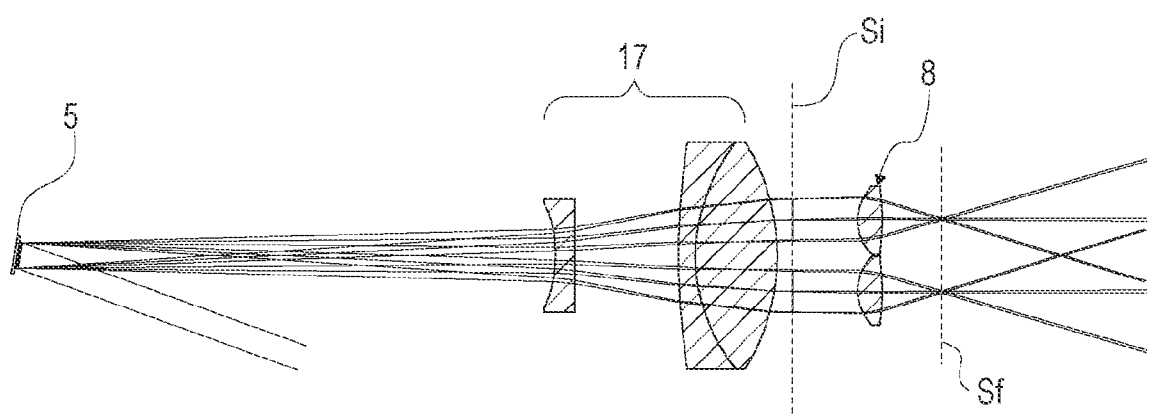
FIG. 21 is an explanatory diagram of an example in which an afocal optical system is applied.

Furthermore, the configuration of the optical system can adopt a configuration as illustrated in FIG. 20 or 21.

FIG. 20 illustrates an example in which a diffusion plate 16 is applied.

Specifically, the diffusion plate 16 is disposed in a position between the image surface S1 and the projection lens 8a in the optical axis direction.

The diffusion plate 16 enlarges the light flux diameter of each light beam incident on the projection lens 8a, and as a result, the pupil diameter can be enlarged.

FIG. 21 illustrates an example in which an afocal optical system 17 is applied.

As illustrated, by arranging the afocal optical system 17 before the image surface Si, each reproduced image Im is enlarged.

Figure 22:
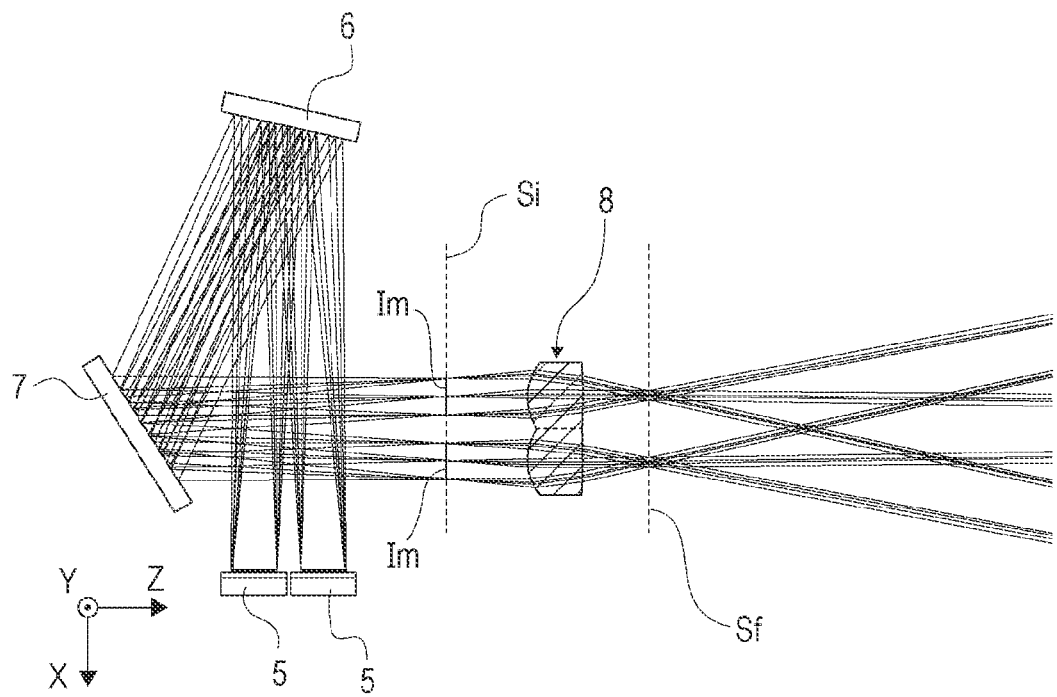
FIG. 22 is an explanatory diagram of an example in a case where a plurality of spatial light phase modulators is used.
Figure 23:
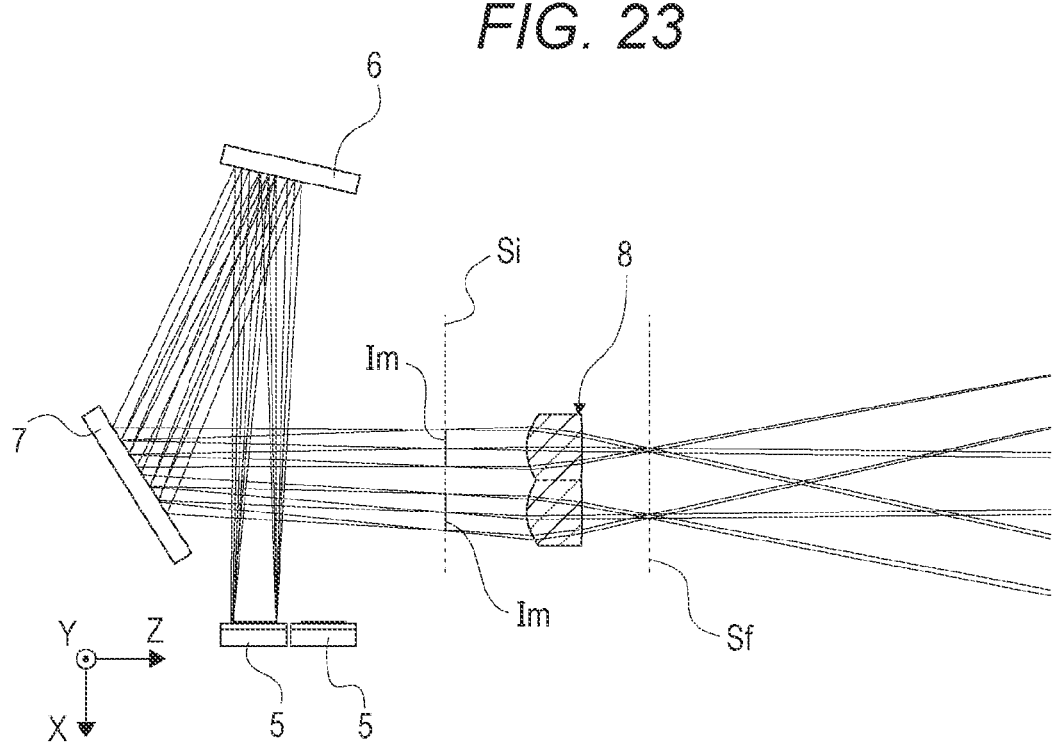
FIG. 23 is also an explanatory diagram of an example of a case where a plurality of spatial light phase modulators is used.

Furthermore, in the above description, an example has been described in which only one phase modulator 5 is used for generating a plurality of reproduced images Im. However, as illustrated in FIGS. 22 and 23, a plurality of phase modulators 5 may be provided, and each phase modulator 5 may generate a plurality of reproduced images Im at intervals on the image surface Si. Here, in FIG. 23, only the light beams output from one phase modulator 5 among the light beams illustrated in FIG. 22 are extracted and illustrated.

As described above, by providing the plurality of phase modulators 5 and configuring each of the phase modulators 5 to generate a plurality of reproduced images Im, the light from the light source unit 2 can be incident on the plurality of phase modulators 5 in a dispersed manner, and the optical energy density can be reduced. Therefore, the life of the phase modulator 5 can be prolonged.

Furthermore, although not illustrated, it is also possible to adopt a configuration in which a plurality of phase modulators 5 corresponding to the light source wavelength is provided, each phase modulator 5 generates a plurality of reproduced images Im on the image surface Si at intervals, and these reproduced images Im are superimposed on the projection surface Sp. For example, it is conceivable that light sources of red (R), green (G), and blue (B) are provided as light sources, and phase modulators 5 of R, G, and B are provided as phase modulators 5, and each phase modulator 5 generates a plurality of reproduced images Im on an image surface Si at intervals on the basis of incident light from the light source of a corresponding color, and these reproduced images Im are superimposed on a projection surface Sp by the projection lens unit 8.

5. Summary of Embodiments

As described above, a lighting device (lighting device 1, 1A, projector device 20) as an embodiment includes a light source unit (light source unit 2) that has a light emitting element, a spatial light phase modulator (phase modulator 5) that generates a plurality of reproduced images at intervals on an image surface by performing spatial light phase modulation on incident light from the light source unit, and a projection unit (projection unit 8, 8') that superimposes and projects the plurality of reproduced images on a projection surface via different projection lenses.

As a result, the reproduced image is projected onto the projection surface via each pupil position dispersed for each projection lens.

Therefore, in a case where the reproduced image is generated using the spatial light phase modulator, the optical energy density at the pupil position can be reduced, and safety can be improved.

Furthermore, in the lighting device as the embodiment, the spatial light phase modulator generates each reproduced image using light incident on an area wider than an area formed by equally dividing the phase modulation surface for each reproduced image.

As a result, the diameter of each light beam at the pupil position can be enlarged as compared with a case where the reproduced image is individually generated for each area formed by equally dividing the phase modulation surface according to the number of reproduced images.

Therefore, the pupil diameter is enlarged, the optical energy density at the pupil position can be reduced, and safety can be enhanced.

Furthermore, the lighting device as the embodiment includes a control unit (control unit 9A) that changes the position or shape of the reproduced image by controlling the phase modulation pattern in the spatial light phase modulator.

As the change in the position of the reproduced image, a change in the in-plane direction position or a change in the optical axis direction position is considered. The position of the projection area of the reproduced image can be adjusted depending on the change in the in-plane direction position, and the focus can be adjusted depending on the change in the optical axis direction position. Furthermore, optical aberration can be corrected depending on a change in the shape of the reproduced image.

According to the above configuration, since the adjustment and correction of the reproduced image are performed by controlling the phase modulation pattern, it is possible to eliminate the need to provide an optical element for the adjustment and correction separately from the spatial light phase modulator, and it is possible to downsize the optical system.

Moreover, in the lighting device as the embodiment, the control unit changes the in-plane direction position of the reproduced image.

As a result, it is possible to adjust the position of the projection area of each reproduced image.

Therefore, even in a case where the projection area of the reproduced image deviates from a desired position due to some factor, the position of the projection area can be corrected to coincide with the desired position.

Furthermore, in the lighting device as the embodiment, the control unit changes the interval in the in-plane direction of the reproduced images according to the projection distance of the reproduced image.

As a result, even when the projection distance changes, it is possible to prevent deviation among the projection areas of the reproduced images.

Therefore, it is possible to prevent degradation of the resolution of the reproduced image on the projection surface due to a change in the projection distance.

Furthermore, in the lighting device as the embodiment, the control unit changes the position of the reproduced image in the optical axis direction.

As a result, it is possible to adjust the focus of the projected image.

Moreover, in the lighting device as the embodiment, the control unit changes the position of the reproduced image in the optical axis direction according to the projection distance of the reproduced image.

As a result, it is possible to compensate for the focus shift of the projected image according to the change in the projection distance.

Therefore, it is possible to prevent degradation of the resolution of the reproduced image on the projection surface due to a change in the projection distance. Furthermore, the need for a configuration for driving the lens to adjust focus of the reproduced image is eliminated, and the optical system can be downsized.

Furthermore, in the lighting device as the embodiment, the control unit changes the shape of the reproduced image.

As a result, it is possible to change the shape of the reproduced image so as to correct optical aberration such as lens distortion.

Optical aberration of the reproduced image can be corrected by the spatial light phase modulator for generating the reproduced image, and the need for providing a separate optical element for correction is eliminated. Hence, the optical system can be downsized.

Furthermore, in the lighting device as the embodiment, the diffusion plate (diffusion plate 16) is disposed between the image surface and the projection lens in the optical axis direction.

The diffusion plate enlarges a light flux diameter of each light beam incident on the projection lens.

Therefore, the pupil diameter can be enlarged, and safety can be improved by reducing the optical energy density at the pupil position.

Furthermore, the lighting device as the embodiment includes a bending optical element (bending optical element 15) that bends incident light beam from the spatial light phase modulator in a direction of increasing the in-plane direction interval of the reproduced images on the image surface.

For example, the in-plane direction interval of the reproduced images on the image surface is increased by a bending optical element such as a prism.

By increasing the in-plane direction interval of the reproduced images, in a case where there is a component required to be arranged in the vicinity of the optical axis of the projection optical system that superimposes and projects the reproduced images, the space for arranging the component can be enlarged, and the component can be easily arranged. For example, in a case where the distance measuring sensor is arranged, it is required to arrange the distance measuring sensor in a position in the vicinity of the optical axis in order to prevent deviation between the field of view of distance measurement and the projection area of the reproduced image. In that case, it is possible to enhance the ease of arrangement of the distance measuring sensor.

Furthermore, a projector device (projector device 20) as an embodiment includes a light source unit (light source unit 2) that has a light emitting element, a spatial light phase modulator (phase modulator 5) that generates a plurality of reproduced images at intervals on an image surface by performing spatial light phase modulation on incident light from the light source unit, a projection unit (projection unit 8, 8') that superimposes and projects the plurality of reproduced images on a projection surface via different projection lenses, and a spatial light intensity modulator (intensity modulator 21) that performs spatial light intensity modulation on the reproduced image on the image surface.

Such a projector device can also provide effects similar to those of the lighting device according to the above embodiment.

Therefore, regarding the projector device that performs spatial light intensity modulation on the reproduced image generated by the spatial light phase modulation and projects the reproduced image on the projection surface, it is possible to reduce the optical energy density at the pupil position and improve safety.

Note that the effect described in the present specification is merely an example and is not limited, and other effects can be obtained.

6. Present Technology

Note that the present technology can also be configured in the following manner.

(1)
A lighting device including:
a light source unit that has a light emitting element;
a spatial light phase modulator that generates a plurality of reproduced images at intervals on an image surface by performing spatial light phase modulation on incident light from the light source unit; and
a projection unit that superimposes and projects the plurality of reproduced images on a projection surface via different projection lenses.

(2)
The lighting device according to (1) above, in which
the spatial light phase modulator generates each reproduced image using light incident on an area wider than an area formed by equally dividing a phase modulation surface for each reproduced image.

(3)
The lighting device according to (1) or (2) above further including
a control unit that changes a position or a shape of the reproduced image by controlling a phase modulation pattern in the spatial light phase modulator.

(4)
The lighting device according to (3) above, in which
the control unit changes an in-plane direction position of the reproduced image.

(5)
The lighting device according to (4) above, in which
the control unit changes an interval in an in-plane direction of the reproduced images according to a projection distance of the reproduced image.

(6)
The lighting device according to any one of (3) to (5) above, in which
the control unit changes a position of the reproduced image in an optical axis direction.

(7)
The lighting device according to (6) above, in which
the control unit changes a position of the reproduced image in an optical axis direction according to a projection distance of the reproduced image.

(8)
The lighting device according to any one of (3) to (7) above, in which
the control unit changes a shape of the reproduced image.

(9)
The lighting device according to any one of (1) to (8) above, in which
a diffusion plate is disposed between the image surface and the projection lens in an optical axis direction.

(10)
The lighting device according to any one of (1) to (9) above further including
a bending optical element that bends an incident light beam from the spatial light phase modulator in a direction of increasing an in-plane direction interval of the reproduced images on the image surface.

(11)
A projector device including:
a light source unit that has a light emitting element;
a spatial light phase modulator that generates a plurality of reproduced images at intervals on an image surface by performing spatial light phase modulation on incident light from the light source unit;
a projection unit that superimposes and projects the plurality of reproduced images on a projection surface via different projection lenses; and
a spatial light intensity modulator that performs spatial light intensity modulation on the reproduced image on the image surface.

REFERENCE SIGNS LIST 1, 1A Lighting device
2 Light source unit
3, 4, 6, 7 Mirror
5 Phase modulator
8, 8' Projection lens unit
8a Projection lens
9, 9A, 9B Control unit
10 Distance measuring sensor
11 Condenser lens
Sp Projection surface
Si Image surface
Sf Pupil position
Im Reproduced image
Sm Phase modulation surface
15 Bending optical element
16 Diffusion plate
17 Afocal optical system
20 Projector device
21 Intensity modulator

What is claimed is:

1. A lighting device, comprising:
a light source unit that has a light emitting element;
a spatial light phase modulator that generates a plurality of reproduced images at intervals on an image surface by performing spatial light phase modulation on incident light from the light source unit;
a projection unit that superimposes and projects the plurality of reproduced images on a projection surface via different projection lenses; and
a control unit that changes a position or a shape of the reproduced image by controlling a phase modulation pattern in the spatial light phase modulator.

2. The lighting device according to claim 1, wherein the spatial light phase modulator generates each reproduced image using light incident on an area wider than an area formed by equally dividing a phase modulation surface for each reproduced image.

3. The lighting device according to claim 1, wherein
the control unit changes an in-plane direction position of the reproduced image.

4. The lighting device according to claim 3, wherein
the control unit changes an interval in an in-plane direction of the reproduced images according to a projection distance of the reproduced image.

5. The lighting device according to claim 1, wherein
the control unit changes a position of the reproduced image in an optical axis direction.

6. The lighting device according to claim 5, wherein
the control unit changes a position of the reproduced image in an optical axis direction according to a projection distance of the reproduced image.

7. The lighting device according to claim 1, wherein
the control unit changes a shape of the reproduced image.

8. The lighting device according to claim 3, wherein
a diffusion plate is disposed between the image surface and the projection lenses in an optical axis direction.

9. A lighting device, comprising:
a light source unit that has a light emitting element;
a spatial light phase modulator that generates a plurality of reproduced images at intervals on an image surface by performing spatial light phase modulation on incident light from the light source unit;
a projection unit that superimposes and projects the plurality of reproduced images on a projection surface via different projection lenses; and
a bending optical element that bends an incident light beam from the spatial light phase modulator in a direction of increasing an in-plane direction interval of the reproduced images on the image surface.

10. The lighting device according to claim 9, wherein the spatial light phase modulator generates each reproduced image using light incident on an area wider than an area formed by equally dividing a phase modulation surface for each reproduced image.

11. The lighting device according to claim 9, further comprising
a control unit that changes a position or a shape of the reproduced image by controlling a phase modulation pattern in the spatial light phase modulator.

12. The lighting device according to claim 11, wherein the control unit changes an in-plane direction position of the reproduced image.

13. The lighting device according to claim 12, wherein the control unit changes an interval in an in-plane direction of the reproduced images according to a projection distance of the reproduced image.

14. The lighting device according to claim 11, wherein the control unit changes a position of the reproduced image in an optical axis direction.

15. The lighting device according to claim 14, wherein the control unit changes a position of the reproduced image in an optical axis direction according to a projection distance of the reproduced image.

16. The lighting device according to claim 11, wherein the control unit changes a shape of the reproduced image.

17. The lighting device according to claim 9, wherein a diffusion plate is disposed between the image surface and the projection lenses in an optical axis direction.

18. A projector device, comprising:
a light source unit that has a light emitting element;
a spatial light phase modulator that generates a plurality of reproduced images at intervals on an image surface by performing spatial light phase modulation on incident light from the light source unit;
a projection unit that superimposes and projects the plurality of reproduced images on a projection surface via different projection lenses; and
a spatial light intensity modulator that performs spatial light intensity modulation on the reproduced image on the image surface.

* * * * *